(12) United States Patent
Kawashima et al.

(10) Patent No.: US 9,559,814 B2
(45) Date of Patent: Jan. 31, 2017

(54) COMMUNICATION METHOD, COMMUNICATION APPARATUS, AND COMMUNICATION SYSTEM

(71) Applicant: FUJITSU LIMITED, Kawasaki-shi, Kanagawa (JP)

(72) Inventors: Kazuya Kawashima, Fukuoka (JP); Tadashige Iwao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 14/524,527

(22) Filed: Oct. 27, 2014

(65) Prior Publication Data

US 2015/0138967 A1  May 21, 2015

(30) Foreign Application Priority Data

Nov. 15, 2013 (JP) ................ 2013-237095

(51) Int. Cl.
*H04W 4/00* (2009.01)
*H04L 1/18* (2006.01)
*H04L 1/00* (2006.01)

(52) U.S. Cl.
CPC ....... *H04L 1/189* (2013.01); *H04L 2001/0093* (2013.01)

(58) Field of Classification Search
CPC .................. H04L 1/189; H04L 2001/0093
See application file for complete search history.

(56) References Cited

U.S. PATENT DOCUMENTS

| | | | | |
|---|---|---|---|---|
| 9,160,676 B2* | 10/2015 | Kim | ........ | H04L 47/34 |
| 2003/0005382 A1 | 1/2003 | Chen et al. | | |
| 2006/0059224 A1* | 3/2006 | Yao | ........ | H04L 12/1868 709/201 |
| 2007/0127421 A1* | 6/2007 | D'Amico | ........ | H04W 72/005 370/338 |
| 2007/0153789 A1* | 7/2007 | Barker | ........ | H04L 12/189 370/390 |
| 2008/0089248 A1* | 4/2008 | Ushiyama | ........ | H04L 12/1854 370/256 |
| 2010/0189086 A1* | 7/2010 | Kats | ........ | H04W 74/04 370/338 |
| 2011/0252122 A1* | 10/2011 | Takeda | ........ | H04L 67/1065 709/223 |
| 2013/0336111 A1* | 12/2013 | Vos | ........ | H04W 4/06 370/230 |

(Continued)

FOREIGN PATENT DOCUMENTS

JP   2004-535124   11/2004

*Primary Examiner* — Phuc Tran
(74) *Attorney, Agent, or Firm* — Staas & Halsey LLP

(57) ABSTRACT

A communication method for causing a communication apparatus included in a network to perform a process. The method includes: specifying an arrangement of the communication apparatus in the network, using the number of adjacent apparatuses, which are apparatuses adjacent to the communication apparatus, and the number of adjacent apparatuses of each of the adjacent apparatuses; determining the number of times of broadcast of a broadcast frame, using number-of-times-information in which candidates for an arrangement of the communication apparatus in the network and the number of times at which the communication apparatus broadcasts a frame are associated; and broadcasting the broadcast frame the determined number of times.

15 Claims, 28 Drawing Sheets

(56) References Cited

U.S. PATENT DOCUMENTS

2014/0003344 A1* 1/2014 Kim ................. H04L 47/34
  370/328
2014/0091911 A1* 4/2014 Ho ..................... G06K 7/01
  340/10.42

* cited by examiner

FIG. 5

| No. | ADJACENT APPARATUS | COMMUNICATION QUALITY | NUMBER OF ENTRIES IN LINK TABLE THAT ADJACENT APPARATUS HOLDS |
|---|---|---|---|
| 1 | N10 | V10 | 4 |
| 2 | N11 | V11 | 5 |
| 3 | N12 | V12 | 6 |
| 4 | N13 | V13 | 5 |
| 5 | N14 | V14 | 4 |
| 6 | N15 | V15 | 5 |
| 7 | N16 | V16 | 6 |
| 8 | N17 | V17 | 5 |

FIG. 6

| No. | GD | LD |
|---|---|---|
| 1-1 | GW | N16 |
| 1-2 | | N17 |
| 1-3 | | N10 |
| 2-1 | N10 | N10 |
| 2-2 | | |
| 2-3 | | |
| 3-1 | N27 | N10 |
| 3-2 | | |
| 3-3 | | |
| ⋮ | ⋮ | ⋮ |

| FID OF RECEIVED BROADCAST FRAME | NUMBER OF TIMES OF RECEPTION |
|---|---|
| 14 | 5 |

44_1a

| FID OF RECEIVED BROADCAST FRAME | NUMBER OF TIMES OF RECEPTION |
|---|---|
| 15 | 1 |

| ARRANGEMENT | COMMUNICATION QUALITY | NUMBER OF TIMES OF BROADCAST |
|---|---|---|
| DISPERSION AREA OR BOUNDARY BETWEEN DISPERSION AREA AND DENSE AREA | $V < G1$ | 1 |
| | $G1 \leq V < G2$ | 2 |
| | $G2 \leq V < G3$ | 3 |
| | $G3 \leq V < G4$ | 4 |
| | $G4 \leq V < G5$ | 5 |
| | $G5 \leq V < G6$ | 6 |
| | $G6 \leq V < G7$ | 7 |
| | $G7 \leq V < G8$ | 8 |
| | $G8 \leq V < G9$ | 9 |
| | $G9 \leq V$ | 10 |
| DENSE AREA | — | SELECTED APPARATUS = 1 |
| | | OTHER THAN SELECTED APPARATUS = 0 |

FIG. 16

| CANDIDATE OF DISTRIBUTION SOURCE OF BROADCAST FRAME | RELAY PERFORMANCE OF DATA TO GW | ELAPSED TIME FROM RECEPTION OF FRAME RELAYED TO GW |
|---|---|---|
| GW | PRESENCE | 20h30min0sec |

| | CANDIDATE OF DISTRIBUTION SOURCE OF BROADCAST FRAME | RELAY PERFORMANCE OF DATA TO GW | ELAPSED TIME FROM RECEPTION OF FRAME RELAYED TO GW | LS OF FRAME RELAYED TO GW |
|---|---|---|---|---|
| No.1 | GW | PRESENCE | 10h30min0sec | N84 |
| No.2 | GW | PRESENCE | 11h30min0sec | N82 |

46_84

| | CANDIDATE OF DISTRIBUTION SOURCE OF BROADCAST FRAME | RELAY PERFORMANCE OF DATA TO GW | ELAPSED TIME FROM RECEPTION OF FRAME RELAYED TO GW | LS OF FRAME RELAYED TO GW |
|---|---|---|---|---|
| No.1 | GW | PRESENCE | 12h30min0sec | N85 |
| No.2 | GW | PRESENCE | 14h30min0sec | N86 |

|  | CANDIDATE OF DISTRIBUTION SOURCE OF BROADCAST FRAME | RELAY PERFORMANCE OF DATA TO GW | ELAPSED TIME FROM RECEPTION OF FRAME RELAYED TO GW | LS OF FRAME RELAYED TO GW |
|---|---|---|---|---|
| No.1 | GW | PRESENCE | 8h30min0sec | N94 |

47_93:

|  | ELAPSED TIME FROM RECEPTION OF FRAME RELAYED TO GLOBAL DESTINATION OTHER THAN GW | LS OF FRAME RELAYED TO GLOBAL DESTINATION OTHER THAN GW |
|---|---|---|
| No.1 | 9h30min0sec | N90 |
| No.2 | 10h30min0sec | N92 |
| No.3 | 21h30min0sec | N91 |

46_96:

|  | CANDIDATE OF DISTRIBUTION SOURCE OF BROADCAST FRAME | RELAY PERFORMANCE OF DATA TO GW | ELAPSED TIME FROM RECEPTION OF FRAME RELAYED TO GW | LS OF FRAME RELAYED TO GW |
|---|---|---|---|---|
| No.1 | GW | PRESENCE | 11h30min0sec | N99 |
| No.2 | GW | PRESENCE | 12h30min0sec | N98 |

47_96:

|  | ELAPSED TIME FROM RECEPTION OF FRAME RELAYED TO GLOBAL DESTINATION OTHER THAN GW | LS OF FRAME RELAYED TO GLOBAL DESTINATION OTHER THAN GW |
|---|---|---|
| No.1 | 20h30min0sec | N95 |

| No. | ADJACENT NODE | COMMUNICATION QUALITY | NUMBER OF ENTRIES IN LINK TABLE THAT ADJACENT APPARATUS HOLDS |
|---|---|---|---|
| 1 | N90 | V90 | 3 |
| 2 | N91 | V91 | 8 |
| 3 | N92 | V92 | 3 |
| 4 | N94 | V94 | 2 |

41_96

| No. | ADJACENT NODE | COMMUNICATION QUALITY | NUMBER OF ENTRIES IN LINK TABLE THAT ADJACENT APPARATUS HOLDS |
|---|---|---|---|
| 1 | N95 | V95 | 2 |
| 2 | N97 | V97 | 3 |
| 3 | N98 | V98 | 6 |
| 4 | N99 | V99 | 4 |

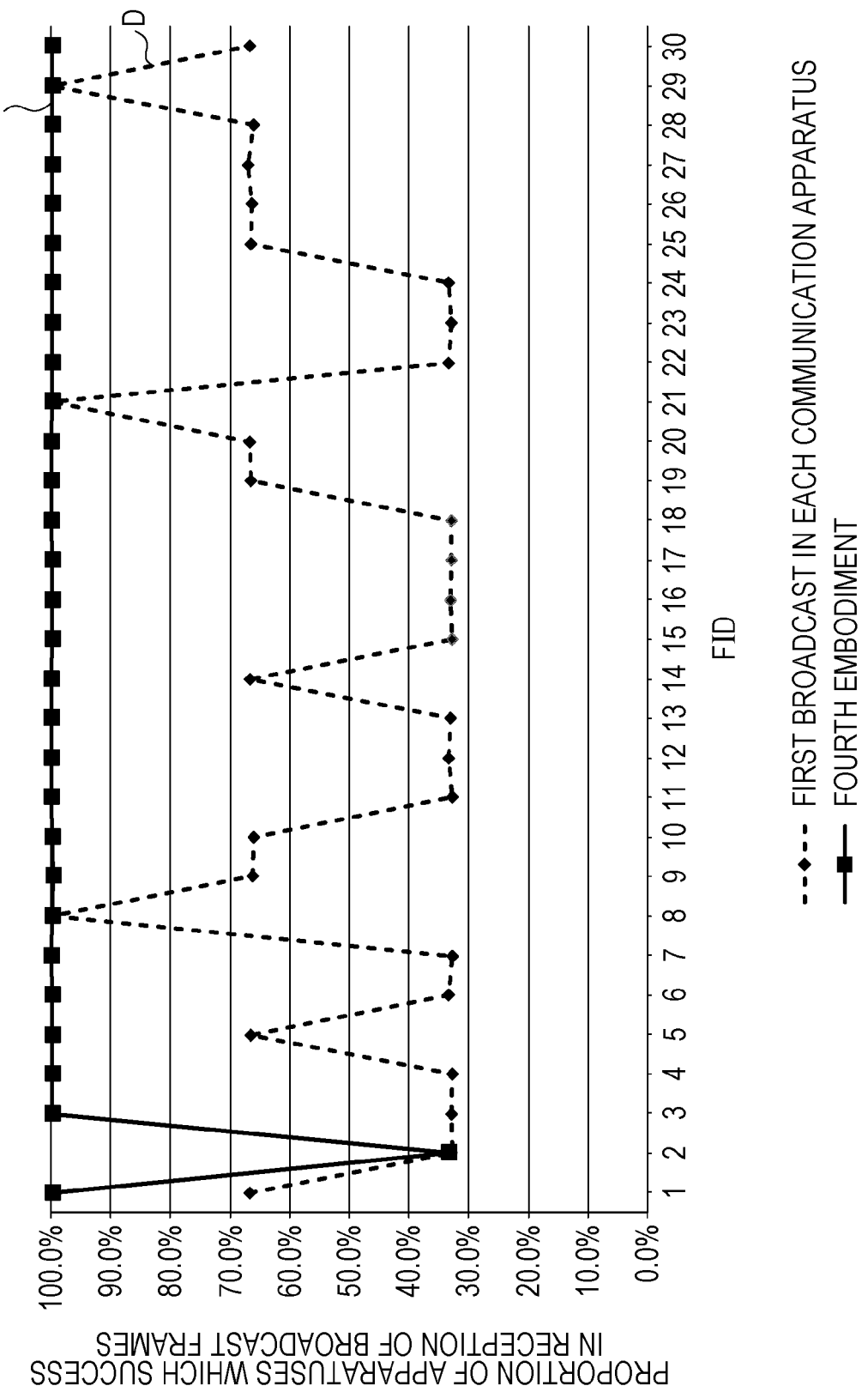

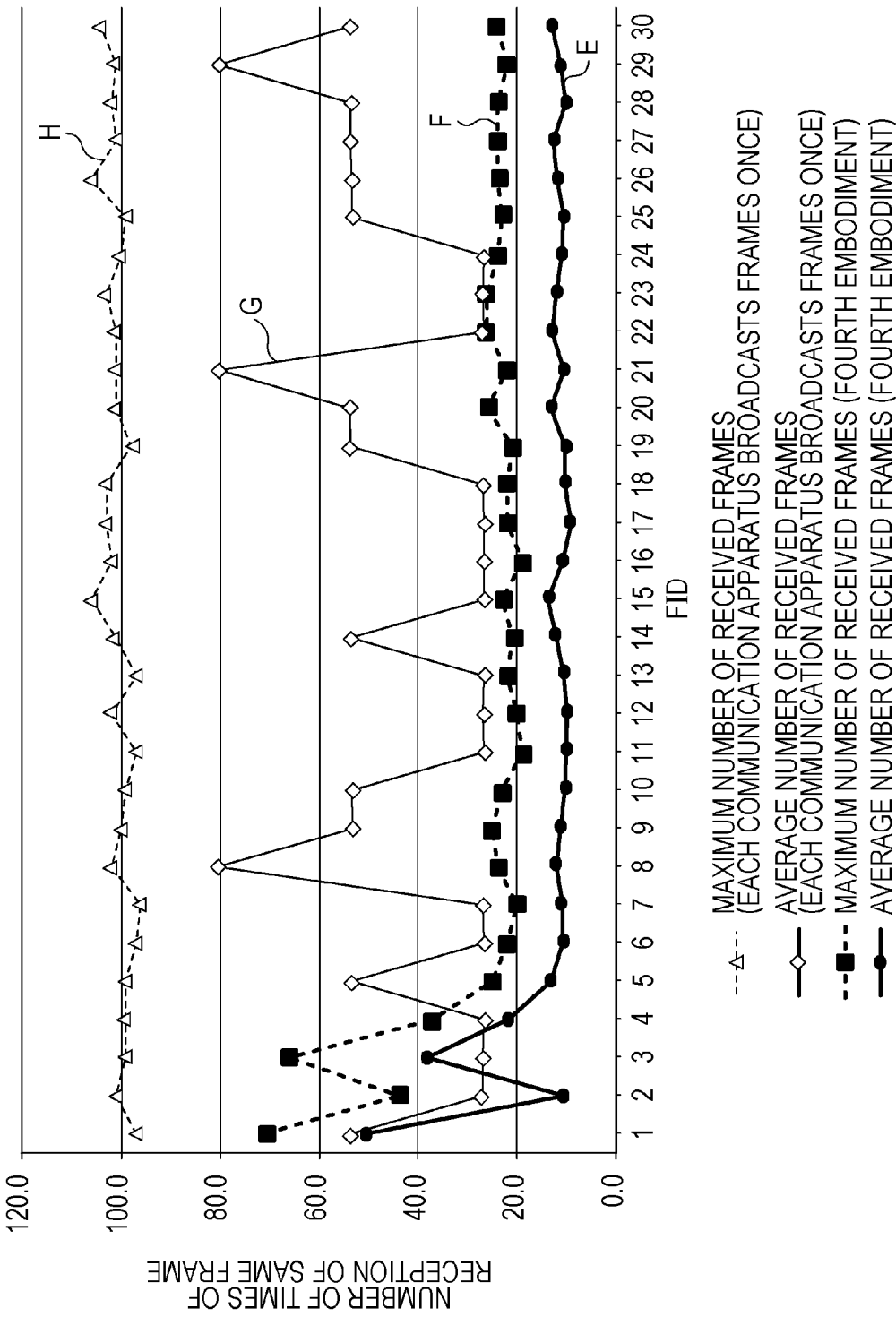

COMMUNICATION METHOD, COMMUNICATION APPARATUS, AND COMMUNICATION SYSTEM

CROSS-REFERENCE TO RELATED APPLICATION

This application is based upon and claims the benefit of priority from the prior Japanese Patent Application No. 2013-237095 filed on Nov. 15, 2013, the entire contents of which are incorporated herein by reference.

FIELD

The embodiments discussed herein are related to communication which is performed in a network including a plurality of communication apparatuses.

BACKGROUND

Even when communication apparatuses participating in a network are added or removed, an ad hoc network is dynamically formed and thus is highly convenient. Therefore, the ad hoc network may be applied to a sensor network. However, after the ad hoc network is formed, information is transmitted to all the communication apparatuses participating in the ad hoc network in some cases such as when program files used in the communication apparatus are updated or when a setting is changed. In this case, the updated program and information such as a setting value are downloaded to a communication apparatus operating as a gateway in the ad hoc network. In the following description, the communication apparatus operating as the gateway in the ad hoc network is simply described as a "gateway". The gateway broadcasts the downloaded information. Further, the communication apparatus which has received a broadcast frame broadcasts a frame including information which is included in the received broadcast frame.

As a related technology, a broadcast communication system has been proposed which re-transmits a frame only when a predetermined number of a negative acknowledgement is received for one or more data frames.

Japanese National Publication of International Patent Application No. 2004-535124 is an example of a related technology.

As has been described as the background art, if the information that the gateway has downloaded is broadcast, a communication apparatus which receives a broadcast frame also performs broadcast, such that the number of frames which are transmitted and received over a network becomes enormous. Therefore, if information is attempted to be transmitted to all communication apparatuses in a network by a broadcast, congestion is likely to occur in the network. Further, if broadcast is attempted to be performed frequently so that congestion does not occur, the transmission interval of the frame is increased, and thus it takes a long time until the data pieces reach all the communication apparatuses in an ad hoc network.

Even if the retransmission method described as the related technology is applied, it is not possible to avoid the occurrence of congestion in a network due to frames other than a re-transmission frame. Further, since the communication apparatus which receives the broadcast frame does not transmit an acknowledgment to a source, the system which has been described as the related technology is not applied to broadcast transmission in the ad hoc network.

An object of embodiments is to provide a communication method of suppressing the occurrence of congestion in the network.

SUMMARY

According to an aspect of the invention, a communication method for causing a communication apparatus included in a network to perform a process. The method includes: specifying an arrangement of the communication apparatus in the network, using the number of adjacent apparatuses, which are apparatuses adjacent to the communication apparatus, and the number of adjacent apparatuses of each of the adjacent apparatuses; determining the number of times of broadcast of a broadcast frame, using number-of-times-information in which candidates for an arrangement of the communication apparatus in the network and the number of times at which the communication apparatus broadcasts a frame are associated; and broadcasting the broadcast frame the determined number of times.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a link table;

FIG. 6 is a diagram illustrating an example of a routing table;

FIG. 7 is a diagram illustrating an example of a broadcast reception table;

FIG. 11 is a diagram illustrating an example of number-of-times-information;

FIG. 16 is a diagram illustrating an example of GW-addressed data reception record;

FIG. 20 is a diagram illustrating an example of GW-addressed frame reception used in the third embodiment;

FIG. 22 is a diagram illustrating an example of GW-addressed frame reception record and relay information;

FIG. 23 is a diagram illustrating an example of a link table;

FIG. 28 is a diagram illustrating an example of a proportion of communication apparatuses which acquire data by broadcast; and FIG. 29 is a diagram illustrating an example of a simulation result of the number of times that the communication apparatus receives the same broadcast frame.

DESCRIPTION OF EMBODIMENTS

Figure 1:
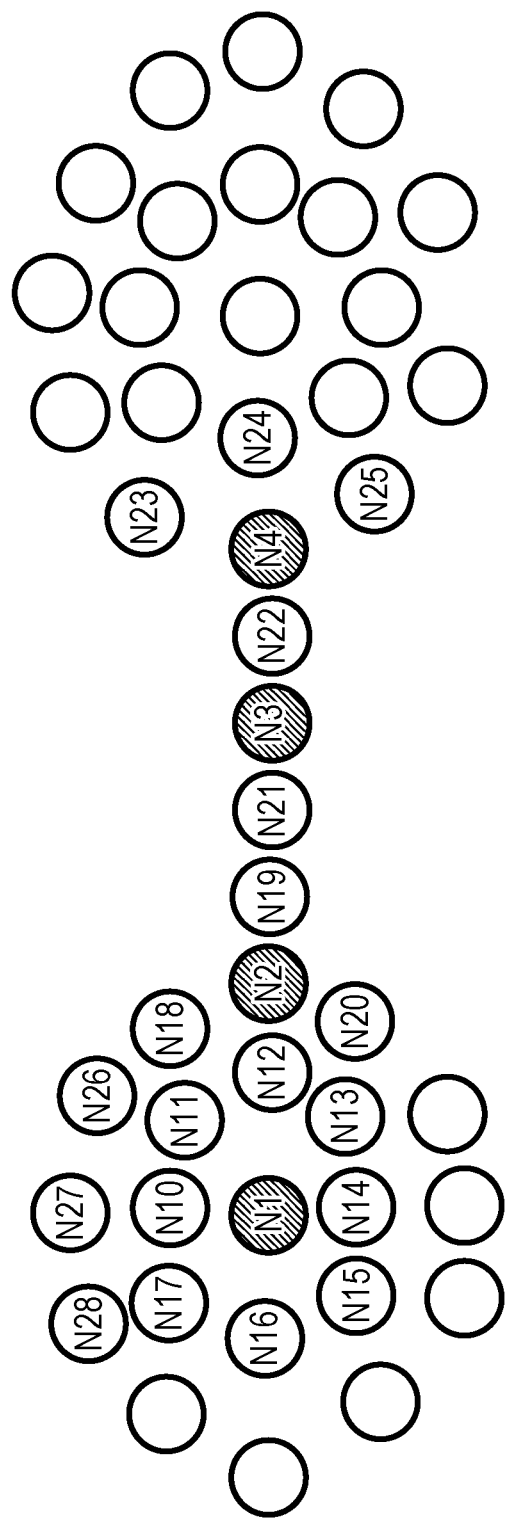
FIG. 1 is a diagram illustrating an example of a communication method according to an embodiment.
Figure 2:
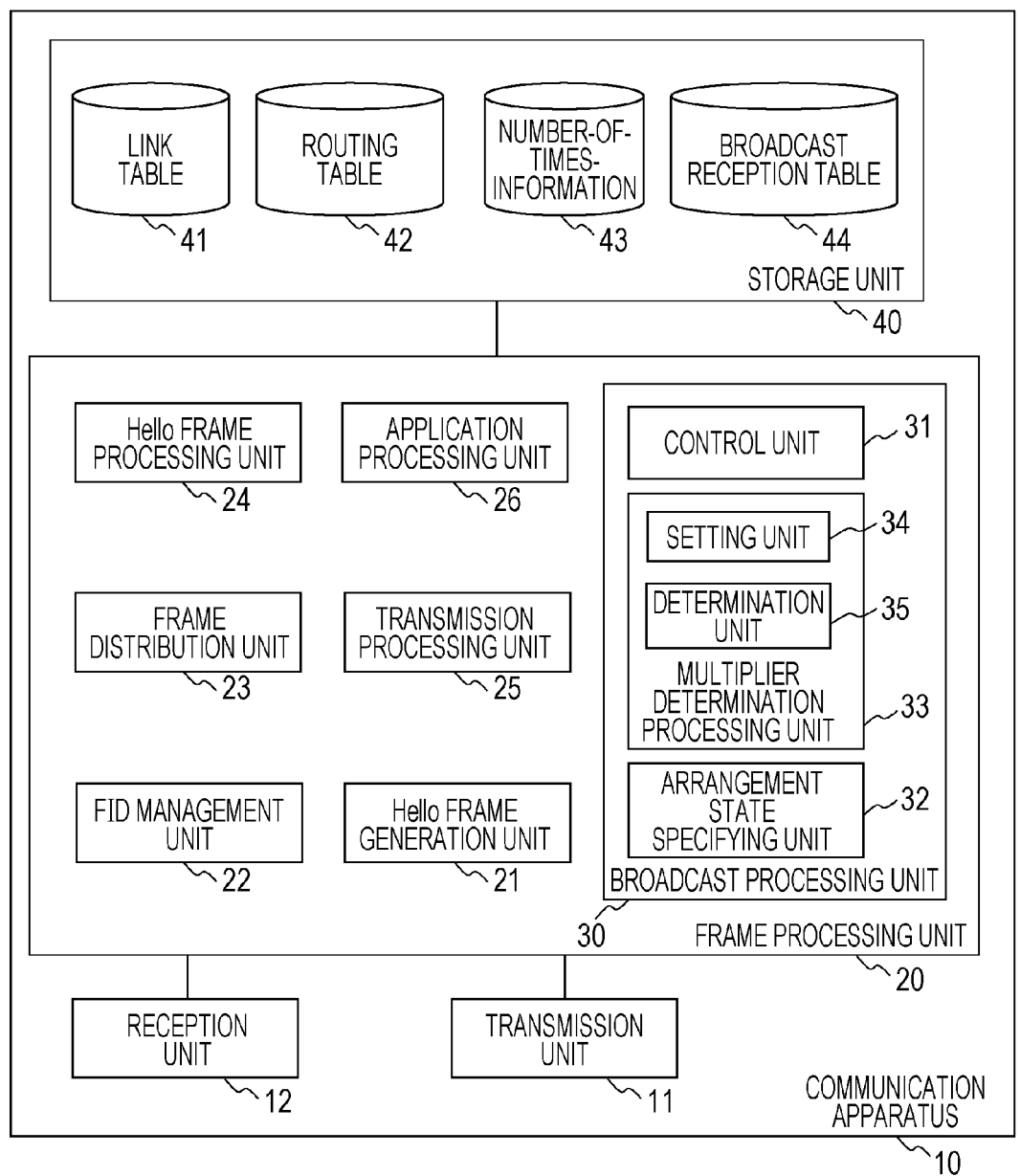
FIG. 2 is a diagram illustrating an example of a configuration of a communication apparatus.

FIG. 1 illustrates an example of a communication method according to an embodiment. In FIG. 1, the communication apparatuses (node apparatuses) participating in an ad hoc network are denoted by circles. The arrangement state of the communication apparatus in the network is determined using the number of adjacent communication apparatuses and the number of communication apparatuses with which each of the adjacent communication apparatuses is capable of communicating. In the following description, it is assumed that the communication apparatus which is "adjacent" to a certain communication apparatus indicates the communication apparatus located within a range in which the communication apparatus is capable of receiving a frame transmitted from the certain communication apparatus. Further, the communication apparatus located within the range in which the communication apparatus is capable of receiving the frame transmitted from the certain communication apparatus is described as the "adjacent apparatus" of the communication apparatus. In addition, a communication apparatus with which the certain communication apparatus is capable of directly communicating without passing through another communication apparatus is an adjacent apparatus of the communication apparatus. Hereinafter, in order to facilitate distinction between the communication apparatuses 10, when specifying the communication apparatuses 10, strings obtained by attaching the number for identifying each communication apparatus 10 to a string "node N" or alphabet N are used.

The communication apparatus specifies the total number of adjacent apparatuses by communicating with the adjacent apparatuses. Further, the communication apparatus obtains also the number of communication apparatuses with which each adjacent apparatus is capable of directly communicating, from each adjacent apparatus. For example, a node N1 of FIG. 1 is capable of directly transmitting and receiving frames with nodes N10 to N17, and a node N12 is capable of directly transmitting and receiving frames with nodes N1, N11, N13, N18, N2, and N20. Then, the node N1 specifies the adjacent apparatuses of the node N1 as eight nodes N10 to N17. Meanwhile, the adjacent apparatuses of the node N12 are six nodes N1, N11, N13, N18, N2, and N20. Therefore, the node N12 notifies the adjacent apparatuses of the node N12 that the number of the adjacent apparatuses of the node N12 is six. Then, the node N1 ascertains that the number of adjacent apparatuses of the node N12 is six. Similarly, the nodes N10, N11, N13 to N17 also respectively notify the total number of adjacent apparatuses to the adjacent communication apparatuses, and thus the node N1 is able to specify the number of communication apparatuses with which each adjacent apparatus is capable of communicating without passing through another communication apparatus, with respect to each adjacent apparatus. Other communication apparatuses including nodes N2 and N3 specify the total number of adjacent apparatuses and the number of communication apparatuses with which each adjacent apparatus is capable of directly communicating, similarly to the node N1.

It is assumed that each communication apparatus stores in advance thresholds Th1 and Th2. The threshold Th1 is used to determine whether the communication apparatus is located in an area in which many communication apparatuses are located in the vicinity as a risk of occurrence of congestion due to broadcast might not be ignored. The threshold Th2 is used to determine whether the number of apparatuses with which each adjacent apparatus is capable of directly communicating has as small a risk of reachability of information being reduced occurring.

When the number of adjacent apparatuses is less than the threshold Th1, a small number of communication apparatuses are located in the vicinity, and thus it is determined that the communication apparatuses are arranged in an area in which congestion due to broadcast is less likely to occur. Then, the communication apparatus repeats the transmission of broadcast frames as frequently as the number which is determined depending on a status of communication with the adjacent apparatuses. For example, the threshold Th1 is set to 4. In this case, the adjacent apparatuses of the node N3 are nodes N21 and N22, and thus the number of adjacent apparatuses is 2. Therefore, if the communication apparatus N3 receives broadcast frames, it broadcasts the received frames as frequently as the number of times which is determined depending on the quality of communication with the nodes N21 and N22.

In contrast, when the number of adjacent apparatuses is equal to or more than the threshold Th1, the communication apparatus determines that it is arranged in an area in which many communication apparatuses are located in the vicinity. Then, the communication apparatus determines whether there is an adjacent apparatus in which the number of communication apparatuses with which the adjacent apparatus is capable of communicating is less than the threshold Th2. If the adjacent apparatus, in which the number of communication apparatuses with which the adjacent apparatus is capable of directly communicating is less than the threshold Th2, fails in the reception of broadcast frames, there is a concern that data does not reach an entire network. Therefore, the communication apparatus broadcasts frames as frequently as the number of times which is determined depending on the quality of communication with the adjacent apparatus. For example, the adjacent apparatuses of the node N2 are four nodes N12, N18 to N20, the node N2 compares the threshold Th2 with the number of communication apparatuses with which each adjacent apparatus is capable of communicating, with respect to each adjacent apparatus. Here, it is assumed that the threshold Th2 is 3 and the communication apparatuses with which node N19 is capable of communicating are 2 nodes N2 and N21. In this case, if the communication apparatus N2 receives a broadcast frame, the communication apparatus N2 broadcasts the received broadcast frame as frequently as the number of times which is determined depending on the quality of communication with the adjacent apparatuses of the node N2, and thus the transmission probability of the frames to the node N19 is increased.

It is determined that the communication apparatus is arranged in an area in which communication apparatuses are densely located, when the number of communication apparatuses with which any adjacent apparatus is capable of communicating is equal to or greater than the threshold Th2. Then, if the communication apparatus is selected as a communication apparatus which is to broadcast a frame, the communication apparatus broadcasts the frame once, however, if the communication apparatus is not selected as a communication apparatus which is to broadcast the frame, the communication apparatus does not perform broadcast. For example, if it is determined that the node N1 is selected as a communication apparatus which is to broadcast a frame, the node N1 broadcasts the frame once. In addition, a method of selecting an apparatus which is to broadcast a frame will be described later.

In this manner, in a method according to the embodiment, each communication apparatus determines the status of arrangement of the communication apparatus located in the vicinity by using the number of adjacent apparatuses and the number of communication apparatuses with which each of the adjacent apparatuses is capable of communicating, and changes the number of times of broadcast in a range of 0 or more, depending on a determination result. Therefore, it is possible to avoid congestion in the network while ensuring the reachability of data.

In addition, in this specification, for convenience of readability, the terms used to express the units of information to be transmitted and received in the network are merely unified to "frame". Therefore, it is assumed that it is possible to replace the term "frame" into "packet" as it is appropriate, depending on implementation.

Apparatus Configuration

The communication apparatus 10 includes a transmission unit 11, a reception unit 12, a frame processing unit 20, and a storage unit 40. The frame processing unit 20 includes a Hello frame generation unit 21, a Frame identifier (FID) management unit 22, a frame distribution unit 23, a Hello frame processing unit 24, a transmission processing unit 25, and an application processing unit 26. The Hello frame includes information of the transmitting communication device and a part of path information stored in the transmitting communication device. Devices going to attend an ad hoc network can determine the path by exchanging information of the network using the Hello frames. The frame processing unit 20 further includes a broadcast processing unit 30. The broadcast processing unit 30 includes a control unit 31, an arrangement state specifying unit 32, and a multiplier determination processing unit 33. The multiplier determination processing unit 33 includes a setting unit 34 and a determination unit 35. The storage unit 40 includes a link table 41, a routing table 42, number-of-times-information 43, and a broadcast reception table 44.

The Hello frame generation unit 21 generates a Hello frame at a predetermined cycle which is determined in advance, and transmits the generated Hello frame to the transmission unit 11. The transmission unit 11 transmits the Hello frame which is input from the Hello frame generation unit 21 to the adjacent communication apparatus 10. Further, the transmission unit 11 transmits the frame which is input from the transmission processing unit 25, the application processing unit 26, the control unit 31, and the like to the local destination of the frame. Here, the "local destination (LD)" indicates a communication apparatus 10 which is designated as a destination, at a time of a single hop transmission which is performed for transmitting a frame to a final destination. Further, the final destination of the frame may be referred to as a "global destination (GD)". In connection therewith, a communication apparatus 10 which has generated a frame may be referred to as a "global source (GS)". Further, the communication apparatus 10 which is a transmission source when a frame is subjected to the single hop transmission may be referred to as a "local source (LS)".

The reception unit 12 receives the frame which is transmitted from the communication apparatus 10. The reception unit 12 outputs the received frame to the FID management unit 22. When the input frame is a broadcast frame, the FID management unit 22 extracts the FID of the broadcast frame. The FID management unit 22 records the FID of the broadcast frames which is transmitted and received within a predetermined period and the number of receptions of frames in the broadcast reception table 44. If the FID of the broadcast frame which is input from the reception unit 12 matches the FID of the broadcast frame which has previously been transmitted and received in the previous time, the FID management unit 22 discards the broadcast frame which is input from the reception unit 12. In contrast, if the FID of the broadcast frame which is input from the reception unit 12 does not match the FID of the broadcast frame which has previously been transmitted and received in the previous time, the FID management unit 22 outputs the input frame to the frame distribution unit 23. In addition, the FID management unit 22 may specify a broadcast frame by any method. For example, the FID management unit 22 may treat a frame in which a global destination address is a broadcast address as a broadcast frame.

The frame distribution unit 23 checks a frame type in an ad hoc header included in the input frame. The value of frame type varies depending on the frame type, and for example, the Hello frame and the data frame have different values. The frame distribution unit 23 is able to store in advance the value of frame type corresponding to each of the types of frames that the communication apparatus 10 may receive, and to appropriately acquire the frame type from the storage unit 40. The frame distribution unit 23 outputs the Hello frame to the Hello frame processing unit 24. The frame distribution unit 23 checks the global destination, when a data frame is input. The frame distribution unit 23 outputs an address distributed to the communication apparatus 10 or a frame in which the broadcast address is designated as the global destination to the application processing unit 26. In contrast, a data frame in which another communication apparatus 10 is designated as the global destination is output to the transmission processing unit 25.

The Hello frame processing unit 24 records information acquired from the Hello frame in the link table 41 and the routing table 42. The Hello frame processing unit 24 calculates a quality of a path to the adjacent communication apparatus 10, using the reception strength of the Hello frame, and the like. The Hello frame processing unit 24 records information regarding the adjacent communication apparatus and the quality of the path to the adjacent communication apparatus 10 in the link table 41. In contrast, the Hello frame processing unit 24 records the path information in the routing table 42 by recording the communication apparatus of a transmission destination (local destination) of a frame in association with the communication apparatus of a global destination of a frame. The examples of the link table 41 and the routing table 42, the use method, and the like will be described later.

The transmission processing unit 25 determines the local destination according to the global destination of a frame which is input from the frame distribution unit 23 so as to determine an ad hoc header. When the local destination is determined, the transmission processing unit 25 refers the routing table 42. The transmission processing unit 25 changes the ad hoc header of a frame to be process and outputs the changed ad hoc header to the transmission unit 11.

The application processing unit 26 processes the frame which is input from the frame distribution unit 23. When the broadcast frame is processed, the application processing unit 26 outputs the data to be broadcasted to the control unit 31.

If data is input from the application processing unit 26, the control unit 31 determines that the broadcast of a frame including data which is input is requested. The control unit 31 makes a request of the specification of an arrangement state of the communication apparatuses 10 to the arrangement state specifying unit 32. The arrangement state specifying unit 32 specifies the number of adjacent apparatuses of the communication apparatus 10 with reference to the link table 41. Here, the number of adjacent apparatuses is the same value of the number of entries of the link table 41. Further, the communication apparatus 10 specifies the number of communication apparatuses 10 which are adjacent to the adjacent apparatus, with each adjacent apparatus. The arrangement state specifying unit 32 specifies the arrangement of the communication apparatus 10, using the number of adjacent apparatuses of the communication apparatus 10 and the number of entries of the link table 41 for each adjacent apparatus. The arrangement specification method will be described later.

The arrangement state specifying unit 32 notifies the specified arrangement to the control unit 31. The control unit 31 determines the number of times of broadcast. At this time, the control unit 31 appropriately refers to number-of-times-information 43. When the communication apparatus 10 is located in an area in which a small number of communication apparatuses 10 are located and is adjacent to the communication apparatuses 10 having a small number of apparatuses with which the communication apparatuses 10 are capable of directly communicating, the control unit 31 determines the number of times of broadcast, using the number-of-times-information 43. In contrast, when the communication apparatus 10 is located in an area in which a large number of communication apparatuses 10 are located, the communication apparatus 10 makes a request of a determination as to whether the communication apparatuses 10 are to broadcast a frame to the multiplier determination processing unit 33. The setting unit 34 determines the values of variables used for calculating a probability that the communication apparatuses 10 are selected as a communication apparatus 10 which performs broadcast, appropriately, with reference to the broadcast reception table 44. The number of receptions of broadcast frames for each FID of a broadcast frame is recorded in the broadcast reception table 44. The determination unit 35 performs a multiplier determination, using the probability calculated using the value which is set in the setting unit 34, and notifies the control unit 31 that the communication apparatus 10 is to broadcast a frame. The process in the setting unit 34 and the determination unit 35 will be described later.

Figure 3:
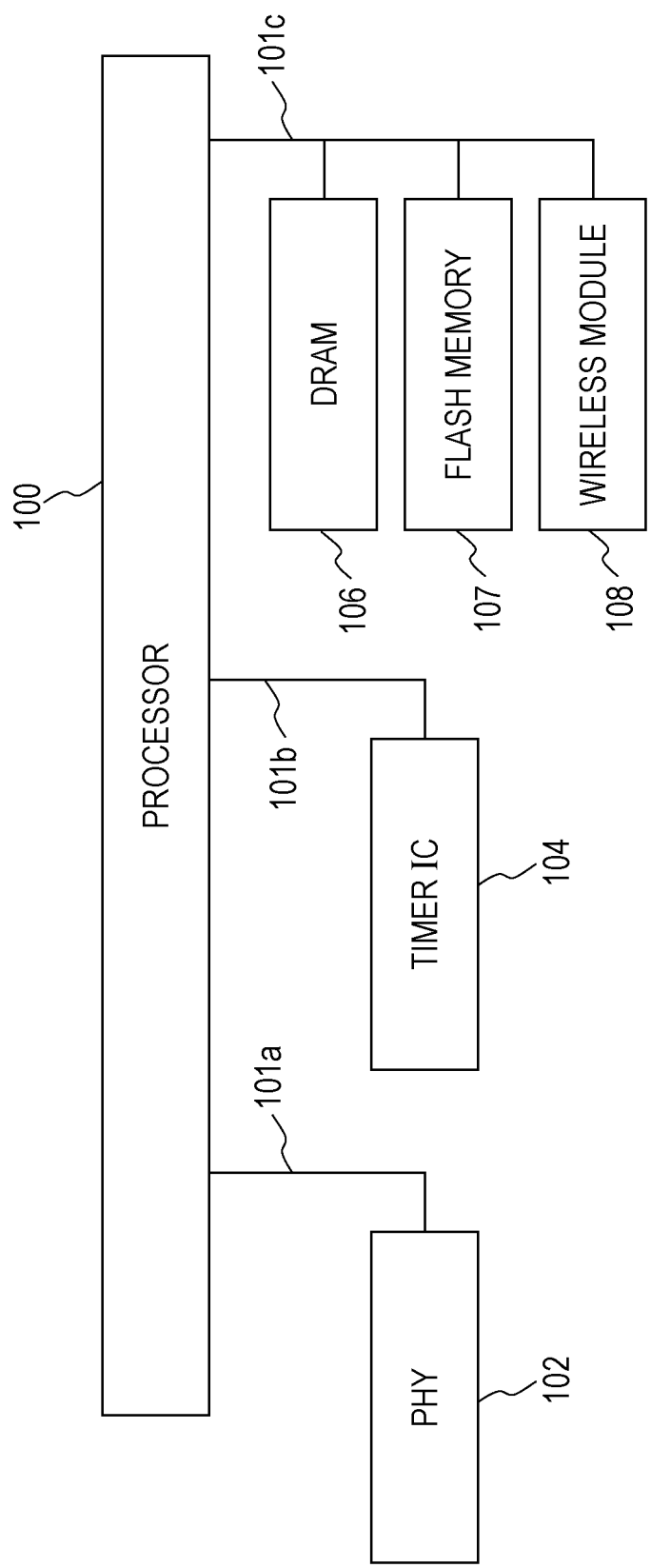
FIG. 3 is a diagram illustrating an example of a configuration of hardware of the communication apparatus.

FIG. 3 is a diagram illustrating an example of hardware configuration of a communication apparatus 10. The communication apparatus 10 includes a processor 100, buses 101 (101a to 101c), a timer IC 104, a dynamic random access memory (DRAM) 106, a flash memory 107, and a wireless module 108. The communication apparatus 10 may include a PHY chip 102 as an option. The buses 101a to 101c are connected to enable the processor 100, the PHY chip 102, the timer IC 104, the DRAM 106, the flash memory 107, and the wireless module 108 to input and output data.

The processor 100 is a certain processing circuit such as a micro processing unit (MPU). The processor 100 reads a program such as a firmware stored in the flash memory 107 and executes a process. At this time, the processor 100 may use the DRAM 106 as a working memory. In the communication apparatus 10, the processor 100 operates as the frame processing unit 20. In the communication apparatus 10, the DRAM 106 operates as the storage unit 40. In the communication apparatus 10, the wireless module 108 operates as the transmission unit 11 and the reception unit 12. The PHY chip 102 is used for wired communication. For example, a communication apparatus 10 operating as a gateway which relays communication between apparatuses in the ad hoc network and another network is capable of communicating with the apparatus in the another network through the PHY chip 102.

The timer IC 104 is used for acquiring time information, measuring an interval for transmission of a Hello frame, measuring an interval for reception of the Hello frame from the adjacent communication apparatus 10, measuring of time elapsed from reception of a frame, and the like. In other words, the timer IC 104 operates a portion of the Hello frame generation unit 21, the Hello frame processing unit 24, the transmission processing unit 25, the application processing unit 26, and the like.

In addition, a program such as firmware is provided while being stored in a computer readable recording medium, and may be installed in the communication apparatus 10. Further the program may be installed in the communication apparatus 10 by being downloaded through the PHY chip 102 or the wireless module 108 from the network. Further, depending on an embodiment, storage medium of types other than the DRAM 106 and the flash memory 107 may be used. Further, the communication apparatus 10 may be implemented by a computer.

First Embodiment

Hereinafter, with respect to a first embodiment, an acquisition of information regarding adjacent communication apparatuses 10, a reception process of a broadcast frame, a specification of an arrangement, and a determination of the number of times of broadcast will be described separately. In the following description, in order to easily distinguish the operation of each communication apparatus 10, a reference symbol may be followed by an under bar and a number assigned to a communication apparatus 10 which performs an operation. Here, the number assigned to a communication apparatus 10 is assumed to a number following alphabet N. Accordingly, for example, the Hello frame generation unit 21 included in the node N1 may be described as a Hello frame generation unit 21_1.

Acquisition of Information Regarding Adjacent Communication Apparatuses

First, a method in which the communication apparatus 10 acquires the number of adjacent apparatuses and information of the number of entries of the link table 41 that each of the adjacent communication apparatus 10 holds will be described. In addition, the number of entries of the link table 41 is the number of the communication apparatuses 10 which are adjacent to the communication apparatus 10 which holds the link table 41.

Each communication apparatus 10 in the ad hoc network transmits a Hello frame containing path information that the communication apparatus 10 holds, to the adjacent communication apparatus 10. For example, when the adjacent apparatuses of the node N10 illustrated in FIG. 1 are nodes N1, N11, N17, and N27, the node N10 transmits the Hello frame to the nodes N1, N11, N17, and N27.

Figure 4:
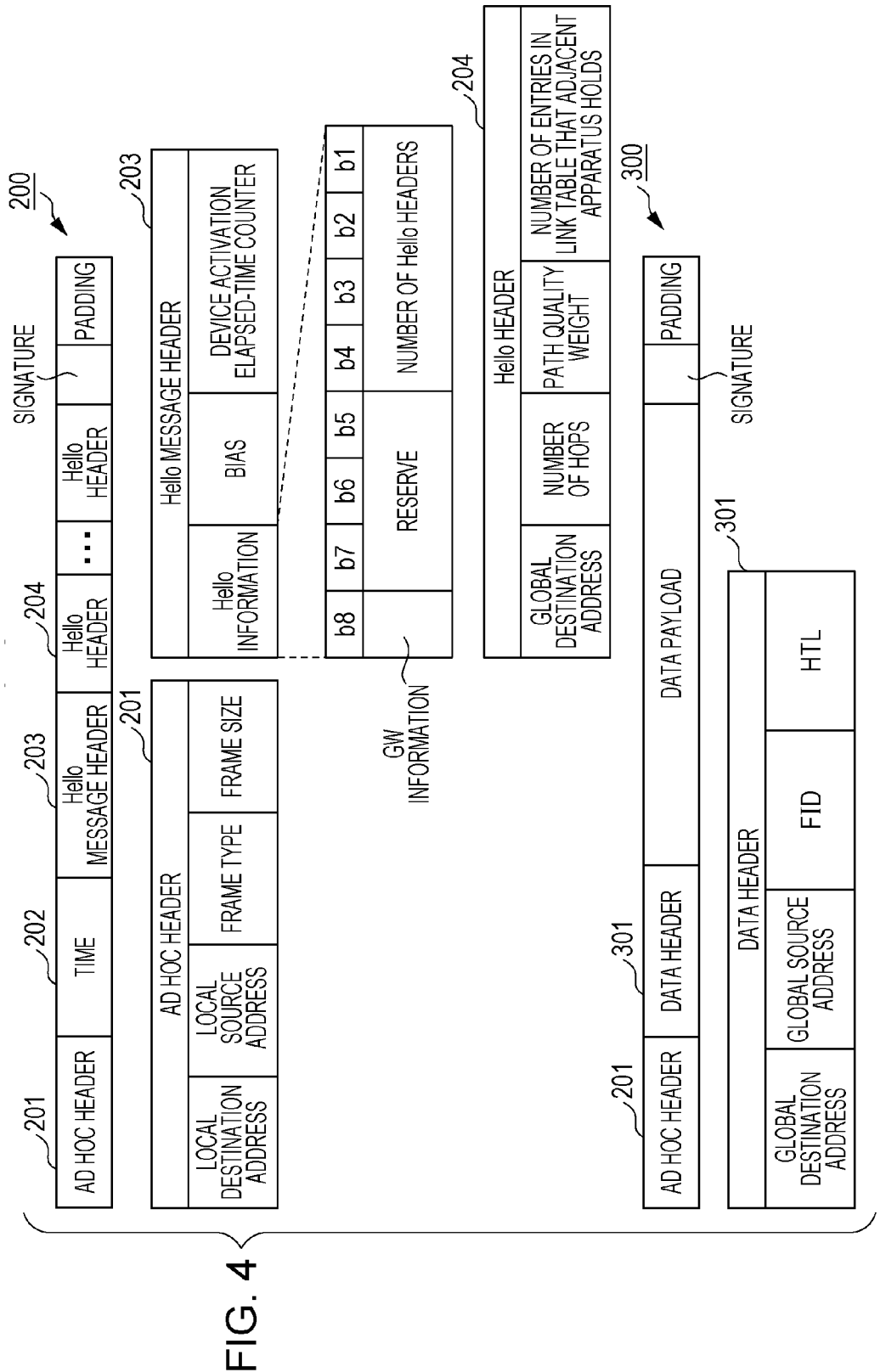
FIG. 4 is a diagram illustrating an example of a format of a frame.

FIG. 4 illustrates an example of a format of a frame. FIG. 4 illustrates the example of a Hello frame 200 and a data frame 300. The data frame 300 will be described later. The Hello frame 200 includes an ad hoc header 201, time information 202, a Hello message header 203, a Hello header 204, signature information, and padding. The ad hoc header 201 includes information such as a local destination address, a local source address, a frame type, and a frame size. In addition, the ad hoc header includes also frames other than the Hello frame, and the types of frames are identified by the values of types. For example, in the data frame, it is set that type=1; and in the Hello frame, it is set that type=0. The time information 202 indicates the time at which the Hello frame is generated. In the Hello frame, the address assigned to the communication apparatus 10 which has generated the Hello frame is set to a local source address. Further, the broadcast addresses indicating the transmission to all the adjacent communication apparatuses 10 are set to the local destination address of the Hello frame.

The Hello message header 203 includes Hello information, a bias, and a device activation elapsed-time counter. The device activation elapsed-time counter indicates time elapsed after the communication apparatus 10 which has generated the Hello frame is activated. The Hello information includes gateway (GW) information, a reserved area, and the number of Hello headers. The gateway information indicates whether the communication apparatus 10 which has generated the Hello frame operates as the gateway. For example, "gateway information=1" indicates that the communication apparatus 10 which has generated the Hello frame operates as the gateway, and "gateway information=0" indicates that the communication apparatus 10 which has generated the Hello frame does not operate as the gateway. The number of the Hello headers is the number of the Hello headers included in the Hello frame, and the number of pieces of path information which is notified with the Hello frame.

The Hello header 204 is used for notifying path information that the communication apparatus 10 which has generated the Hello frame holds. In the example of FIG. 4, the Hello header 204 includes a global destination address, the number of hops, a path quality weight, and the number of entries. The global destination address is the address of the communication apparatus 10 which is the final destination of path information notified with the Hello header. The number of hops is the number of hops from the communication apparatus 10 which has generated the Hello frame to the global destination. The path quality weight is a value indicating a quality of a path from the communication apparatus 10 which has generated the Hello frame to the global destination. When the information regarding a path leading to the communication apparatus 10 which has generated is stored in the Hello header, the number of entries is valid, and is the number of entries of the link table 41 that the communication apparatus 10 which has generated the Hello frame holds.

For example, the node 10 illustrated in FIG. 1 records the number of entries of link table 41_10 that the node N10 holds, in the Hello header in which the node N10 is the global destination. Examples of information elements included in the Hello frame 200_10 generated by the Hello frame generation unit 21_10 in the node N10 will be discussed.

| | |
|---|---|
| Local source address: | node N10 |
| Local destination address: | all the adjacent communication apparatuses 10 |
| Type: | Hello frame |
| Time: | 12:00:00 |
| Number of Hello headers: | 3 |
| Hello header 1 | |
| Global destination address: | node N10 |
| Number of hops: | 0 |
| Number of entries: | 4 |
| Hello header 2 | |
| Global destination address: | node N27 |
| Number of hops: | 1 |
| Hello header 3 | |
| Global destination address: | GW |
| Number of hops: | 3 |

The Hello frame generation unit 21_10 outputs the Hello frame 200_10 to the transmission unit 11_10. The transmission unit 11_10 of the node N10 transmits the Hello frame 200_10 to all the communication apparatuses 10 adjacent to the node N10.

If the reception unit 12_1 of the node N1 receives the Hello frame 200_10, outputs the Hello frame 200_10 to the FID management unit 22_1. The FID management unit 22_1 outputs the Hello frame 200_10 to the frame distribution unit 23_1. Since the frame type of the input frame is a Hello frame, the frame distribution unit 23_1 outputs the Hello frame 200_10 to the Hello frame processing unit 24_1. The Hello frame processing unit 24_1 updates the link table 41_1 that the node N1 holds and the routing table 42_1, using the Hello frame 200_10.

FIG. 5 illustrates an example of the link table 41 that the node N1 holds. In the example of FIG. 5, the communication quality of a path to the adjacent apparatus and the number of entries in the link table 41 that the adjacent apparatus holds are recorded in the link table 41, in association with the identifier of the adjacent apparatus which is the source of the Hello frame. The Hello frame processing unit 24_1 extracts information included in the Hello frame 200_10, and records the source of the Hello frame and the number of entries in the source in the link table 41_1.

The communication quality is calculated using an average value of a reception interval, a dispersion value of the reception interval, an average value of a reception strength, a dispersion value of a reception strength, and the like. As the reception interval of the Hello frame is closer to a correct value, the Hello frame processing unit 24_1 sets the communication quality better, and as the reception strength of the Hello frame is greater, the Hello frame processing unit 24_1 sets the communication quality to a good value. Further, as either the dispersion value of the reception interval or the dispersion value of the reception strength of the Hello frame becomes smaller, the Hello frame processing unit 24_1 may set the communication quality to a good value. In addition, the calculation method of the communication quality described here is an example, and the calculation method of the communication quality may vary depending on the implementation. The Hello frame processing unit 24_1 processes the Hello frame 200_10, and thus information of No. 1 in FIG. 5 is recorded in the link table 41_1.

FIG. 6 illustrates an example of the routing table 42. The routing table 42 may record one or more local destinations with respect to one global destination. The routing table 42 illustrated in FIG. 6 may record the following three local destinations with respect to one global destination. The Hello frame processing unit 24 records the communication apparatuses 10 of the sources of the Hello frame in the routing table 42, is the local destinations for the global destination of the Hello header. For example, when the node N1 receives the Hello frame described above from the node N10, the Hello frame processing unit 24_1 records the entries of No. 1-3, No. 2-1, and No. 3-1 of the routing table 42_1.

Although the process of the node N1 is described in detail in the foregoing description, if the nodes N11, N17, and N27 also receive the Hello frame from the node N10, the same process as that of the node N1 is performed. Further, any communication apparatus 10 in the network also transmits the Hello frame to the adjacent communication apparatuses 10 at a predetermined time interval. Therefore, all the communication apparatuses 10 in the network may specify adjacent communication apparatuses 10 and the number of entries of the link table 41 that each adjacent apparatus holds.

Reception Process of Broadcast Frame

Next, the format of a broadcast frame and an example of a process which is performed when the communication apparatus 10 receives the broadcast frame will be described.

Since the broadcast frame is a type of a data frame, it has a format illustrated in the data frame 300 of FIG. 4. Accordingly, the broadcast frame includes an ad hoc header 201, a data header 301, a data payload, a signature, and padding. The ad hoc header 201 in the data frame is the same as the ad hoc header 201 included in the Hello frame. The data header 301 includes a global destination address, a global source address, a frame identifier (FID), and a HTL (hop to live).

In the broadcast frame, the broadcast address is designated as the global destination address in the data header 301, and the address of the communication apparatus 10 which has generated the data payload in the data frame is set as the global source address. Accordingly, in a case of a broadcast frame, the address of the communication apparatus 10 which has started the distribution of data is designated as the global source address in the data header 301. For example, when the gateway distributes data for version upgrade to each communication apparatus 10 in the ad hoc network, the address of the gateway is set as the global source address. The frame identifier is an identification number assigned to each data frame. HTL is a value representing an expiration date of the data frame. The value of the HTL is increased by one when a frame is transmitted to another communication apparatus 10 by the transmission processing unit 25. In addition, if HTL=0, the data frame is discarded.

It is assumed that the node N1 in the network illustrated in FIG. 1 has received a broadcast frame. Then, the reception unit 12_1 outputs the broadcast frame to the FID management unit 22_1. The FID management unit 22_1 extracts a frame identifier in the broadcast frame, and refers to the broadcast reception table 44. The frame identifier and the number of receptions with respect to a latest frame among the broadcast frames which are received up to then are recorded in the broadcast reception table 44. FIG. 7 illustrates an example of the broadcast reception table 44. For example, the frame identifier of the latest frame among the broadcast frames that the node N1 receives is 14, and it is assumed that the node N1 receives five frames of "the frame identifier=14". In this case, the node N1 holds the broadcast reception table 44_1a (FIG. 7).

The FID management unit 22_1 discards the broadcast frame including the same data as that in the frame that has already been received, by comparing the value of the frame identifier in the broadcast frame with the frame identifier in the broadcast reception table 44_1a. In addition, when the frame identifier in the broadcast frame and the frame identifier in the broadcast reception table 44_1a match, the FID management unit 22_1 increases the number of receptions in the broadcast reception table 44_1a by one. For example, if the FID of the input broadcast frame is 14, the FID management unit 22_1 discards the broadcast frame, and changes the number of receptions in the broadcast reception table 44_1a from 5 to 6.

In contrast, when the input broadcast frame is a frame which is first received, the FID management unit 22_1 outputs the broadcast frame to the frame distribution unit 23_1. Further, the FID management unit 22_1 changes the value of the frame identifier in the broadcast frame, and sets the number of receptions to 1. At this time, FID management unit 22_1 outputs the number of receptions and the FID before the broadcast reception table 44_1 is updated to the setting unit 34_1. For example, if the node N1 receives the broadcast frame of "the frame identifier=15", the FID management unit 22_1 replaces the broadcast reception table 44_1a with the broadcast reception table 44_1b. Further, the FID management unit 22_1 notifies the setting unit 34_1 that the number of receptions of the frame of "FID=14" is 5.

The frame distribution unit 23_1 outputs the broadcast frame which is input from the FID management unit 22_1 to the application processing unit 26_1. If a broadcast frame is input, the application processing unit 26_1 processes a data payload of the input frame. Further, the application processing unit 26_1 outputs the broadcast frame to the control unit 31_1 in order to broadcast the input broadcast frame.

If the broadcast frame is input from the application processing unit 26_1, the control unit 31_1 determines that the broadcast of the input frame is requested, and makes a request the specification of the arrangement state of the node N1 to the arrangement state specifying unit 32_1. The process of the arrangement state specifying unit 32_1 will be described later. Although the process of the node N1 has been described as an example in the foregoing description, any communication apparatus 10 which has received the broadcast frame processes the broadcast frame in the same manner as in the node N1.

Specification of Arrangement

Figure 8:
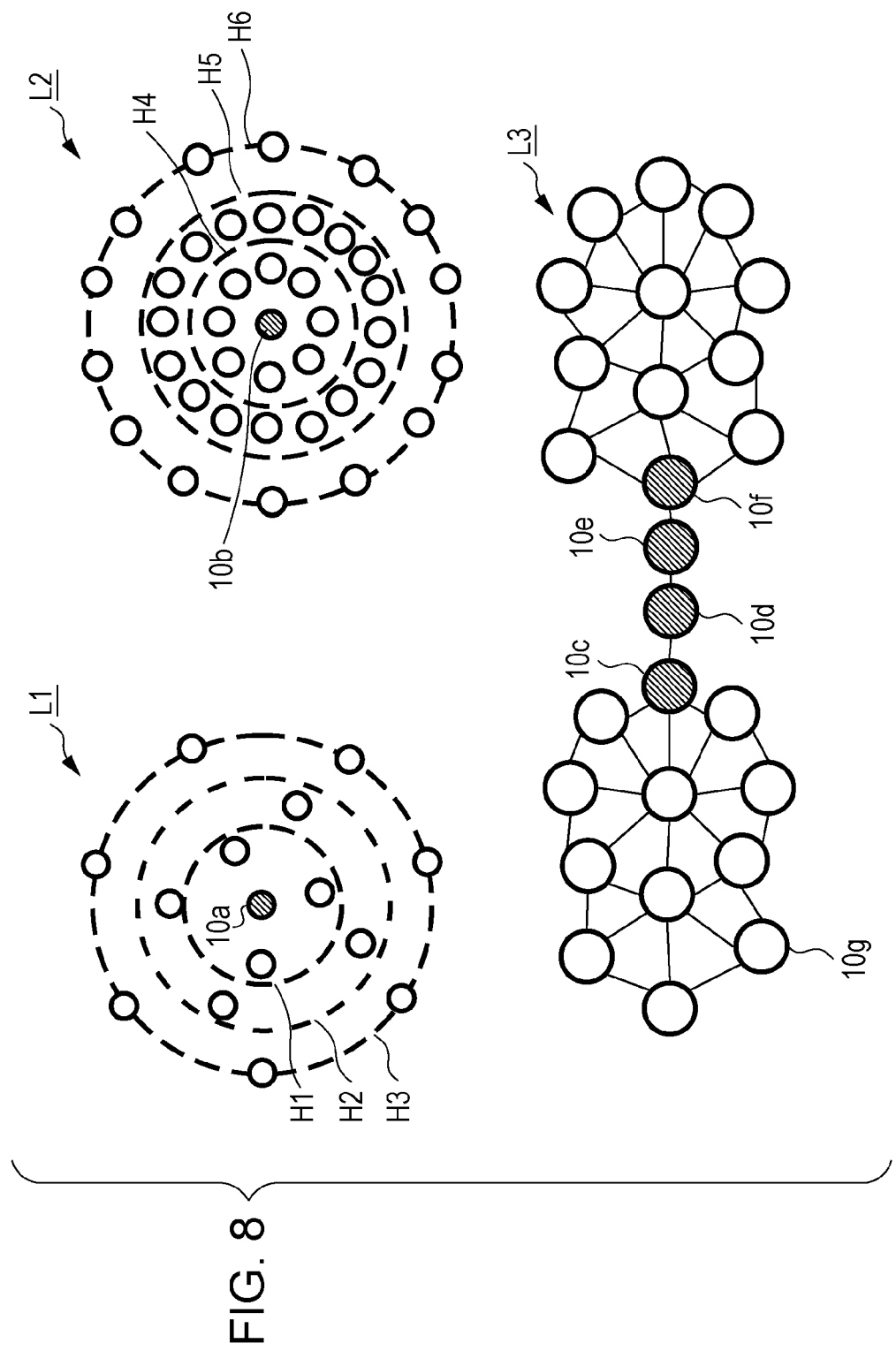
FIG. 8 is a diagram illustrating an example of an arrangement of the communication apparatus.

FIG. 8 illustrates an example of an arrangement of communication apparatuses 10. The arrangement of the communication apparatus 10 may be classified into three types: an arrangement to a dispersion area, an arrangement to a dense area, and an arrangement to a boundary between the dispersion area and the dense area. Hereinafter, an example of a specification method of an arrangement will be described using the threshold Th1 and the threshold Th2. The threshold Th1 is a threshold that is to be compared with the number of adjacent apparatuses, and the threshold Th2 is a threshold that is to be compared with the number of entries of the link table that the adjacent apparatuses hold. The threshold Th1 is minimum value of the number of adjacent apparatuses, by which the occurrence of congestion due to broadcast might not be ignored, in some area in the network. The threshold Th2 is a lower limit of the number of adjacent apparatuses which does not cause a decrease in reachability of information, by some communication apparatuses 10 not performing broadcast to the adjacent apparatuses. Although a case in which the thresholds used for determination of the arrangement is set as "Th1=4 and Th2=3" has been described as an example in the following description, the values of the threshold Th1 and threshold Th2 may be arbitrarily set depending on the implementation.

The "dispersion area" is an area in which communication apparatuses 10 are arranged as densely as congestion does not occur even when a broadcast frame is transmitted. In the following description, the communication apparatus 10 of which the number of adjacent apparatuses is less than the threshold Th1 is referred to as a communication apparatus 10 which is arranged in the "dispersion area". In the dispersion area, as illustrated in the arrangement L1 of FIG. 8, the density between the communication apparatuses 10 is relatively low. The dashed lines (H1 to H3) in the arrangement L1 respectively represent the areas in the arrangement L1 which a frame transmitted from the communication apparatus 10a reach by the same number of hops. For example, a frame reaches at three communication apparatuses 10 located in the inside of H1 circle from the communication apparatus 10a to by one hop. In contrast, a frame is transmitted from the communication apparatus 10a to the communication apparatuses 10 contained between H1 circle and H2 circle by two hops, and a frame is transmitted from the communication apparatus 10a to the communication apparatuses 10 on H3 circle by three hops. In other words, in the example of the arrangement L1, the adjacent apparatuses of the communication apparatus 10a are three communication apparatuses 10 located in the inside of H1 circle. Here, since the threshold Th1=4, the communication apparatus 10a is included in the dispersion area.

The "dense area" is an area in which congestion occurs when all the communication apparatuses 10 in the area perform broadcast. In the following description, the communication apparatus 10 of which the number of adjacent apparatuses is equal to or greater than the threshold Th1 and the number of apparatuses with which all the adjacent apparatuses are capable of communicating is equal to or greater than the threshold Th2 is referred to as a communication apparatus 10 which is arranged in the "dense area". In the dense area, as illustrated in the arrangement L2 of FIG. 8, the density between the communication apparatuses 10 arranged in the network is relatively high. The dashed lines (H4 to H6) in the arrangement L2 respectively represent the areas in the arrangement L2 which a frame transmitted from the communication apparatus 10b reach by the same number of hops. H4 represents one hop from the communication apparatus 10b, H5 represents two hops from the communication apparatus 10b, and H6 represents three hops from the communication apparatus 10b. In the example of the arrangement L2, the adjacent apparatuses of the communication apparatus 10b are eight communication apparatuses 10 located in the inside of H4 circle. Accordingly, when the threshold Th1=4 and the number of communication apparatuses 10 with which each of the adjacent apparatuses of the communication apparatus 10b is capable of directly communicating exceeds the threshold Th2, an area having the arrangement L2 is determined to the dense area. In the dense area, in order to avoid congestion, the communication apparatuses 10 selected among communication apparatuses 10 in the dense area perform broadcast, and the communication apparatuses 10 which are not selected do not perform broadcast. The selection of the communication apparatuses 10 which perform broadcast will be described later.

The arrangement L3 of FIG. 8 is an arrangement including a boundary between the dispersion area and the dense area. In the communication apparatus 10 located in "the boundary between the dispersion area and the dense area", the number of adjacent apparatuses meets the standard of the dense area, but the number of communication apparatuses 10 with which at least one among the adjacent apparatuses is capable of communicating without passing through another apparatus is less than the threshold Th2.

In the arrangement L3, in order to clearly express the adjacent apparatuses of each communication apparatus 10, the communication apparatuses 10 which are adjacent with each other are linked by a solid line. Since the number of adjacent apparatuses of the communication apparatus 10c is four, the communication apparatus 10c meets the standard of the dense area for the number of the adjacent apparatuses. However, since the number of adjacent apparatuses of the communication apparatus 10d, which is the adjacent apparatus of the communication apparatus 10c is two, the communication apparatus 10d is not able to receive the information transmitted from the area including the communication apparatus 10c, from an apparatus other than the communication apparatus 10c. Therefore, for example, if the communication apparatus 10c does not transmit the data delivered from the communication apparatus 10g, the delivered data does not reach the communication apparatus 10d. Therefore, the communication apparatus 10c performs broadcast, as the communication apparatus 10 located in the boundary between the dense area and the dispersion area.

Even in the communication apparatus 10f, similarly to the communication apparatus 10c, since the number of adjacent apparatuses is equal to or greater than the threshold Th1, the number of adjacent apparatuses meets the standard of the dense area. However, if the communication apparatus 10f does not broadcast the frame received from the communication apparatus 10e, data included in the frame that the communication apparatus 10f receives from the communication apparatus 10e is not delivered to an apparatus other than the communication apparatus 10e among adjacent apparatuses of the communication apparatus 10f. Therefore, the communication apparatus 10f also performs broadcast as the communication apparatus 10 located in the boundary between the dense area and the dispersion area.

Figure 9:
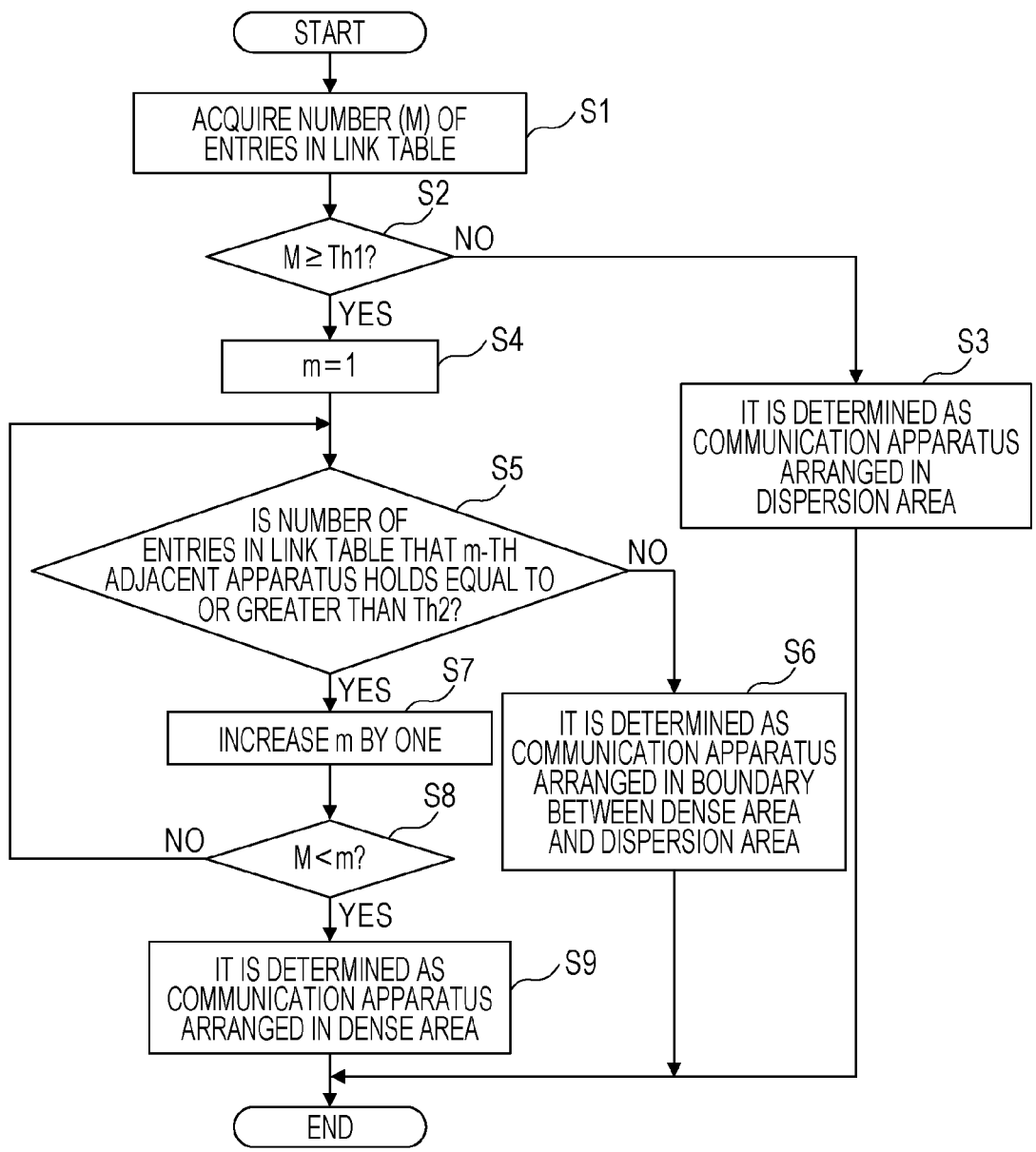
FIG. 9 is a flowchart illustrating an example of an arrangement specification method.

FIG. 9 is a flow chart illustrating an example of an arrangement specification method. With reference to FIG. 9, an example of a method in which the arrangement state specifying unit 32 specifies the arrangement of the communication apparatus 10 will be described. When the arrangement is specified, the arrangement state specifying unit 32 uses an integer M and a variable m in addition to the thresholds Th1 and Th2. The integer M indicates the number of adjacent apparatuses of the communication apparatus 10 that performs the process illustrated in FIG. 9. The variable m is used for counting the number of the adjacent apparatuses which have compared the threshold Th2 with the number of entries in the link table 41.

If the specification of the arrangement is requested from the control unit 31, the arrangement state specifying unit 32 acquires the number (M) of entries included in the link table 41 that the communication apparatus 10 holds (step S1). The number of entries included in the link table 41 is the number of the adjacent apparatuses of the communication apparatus 10. The arrangement state specifying unit 32 compares the threshold Th1 with the number M of the adjacent apparatuses (step S2). When the number M of the adjacent apparatuses is smaller than the threshold Th1, it is predicted that the congestion does not occur even if the broadcast is performed. Thus, when the number M of the adjacent apparatuses is smaller than the threshold Th1, the arrangement state specifying unit 32 determines that the communication apparatuses 10 are arranged in the dispersion area (No in step S2, step S3).

When the number M of the adjacent apparatuses is equal to or greater than the threshold Th1, there is a risk that congestion due to broadcast occurs. Thus, the arrangement state specifying unit 32 performs a process for determining whether the communication apparatus 10 is arranged in a boundary between the dense area and the dispersion area. The arrangement state specifying unit 32 sets the variable m to 1 (Yes in step S2, step S4). The arrangement state specifying unit 32 compares the threshold Th2 with the number of entries of the link table 41 that the m-th adjacent apparatus holds, with reference to the link table 41 (step S5). In other words, the arrangement state specifying unit 32 compares the threshold Th2 with the number of communication apparatuses 10 with which the m-th adjacent apparatus is capable of communicating without passing through another apparatus. When the number of entries of the link table 41 that the m-th adjacent apparatus holds is less than the threshold Th2, the arrangement state specifying unit 32 determines that the communication apparatus 10 is arranged in a boundary between the dense area and the dispersion area (No in step S5, step S6).

In contrast, when the number of entries of the link table 41 that the m-th adjacent apparatus holds is equal to or greater than the threshold Th2, the arrangement state specifying unit 32 increases the variable m by one, and compares the variable m with the number M of the adjacent apparatuses (Yes in step S5, steps S7 and S8). The arrangement state specifying unit 32 repeats steps S5 to S8 until the variable m becomes greater than the value of the number M of the adjacent apparatuses (No in step S8). If the variable m becomes greater than the value of the number M of the adjacent apparatuses, since the number of entries of the link table 41 is equal to or greater than the threshold Th2, the arrangement state specifying unit 32, even in any adjacent apparatus, determines that the communication apparatus 10 is arranged in the dense area (Yes in step S8, step S9). The arrangement state specifying unit 32 notifies the specified arrangement to the control unit 31.

Determination of the Number of Times of Broadcast

If the arrangement of the communication apparatus 10 is notified from the arrangement state specifying unit 32, the control unit 31 determines how many times to broadcast a frame, for the successful propagation of data at a proportion of a predetermined probability or more according to the arrangement. For example, when a frame is transmitted through a path having a bad communication quality in the dispersion area, the control unit 31 repeats the broadcast of the same frame by increasing the number of times of broadcast. In contrast, when a frame is transmitted in the dense area or when a frame is transmitted through a path having a good communication quality, the control unit 31 reduces the number of frames transmitted and received in the network as much as possible, by reducing the number of times of broadcast.

Hereinafter, an example of a method in which the control unit 31 of the communication apparatus 10 determines the number of times of broadcast according to the arrangement will be described.

Figure 10:
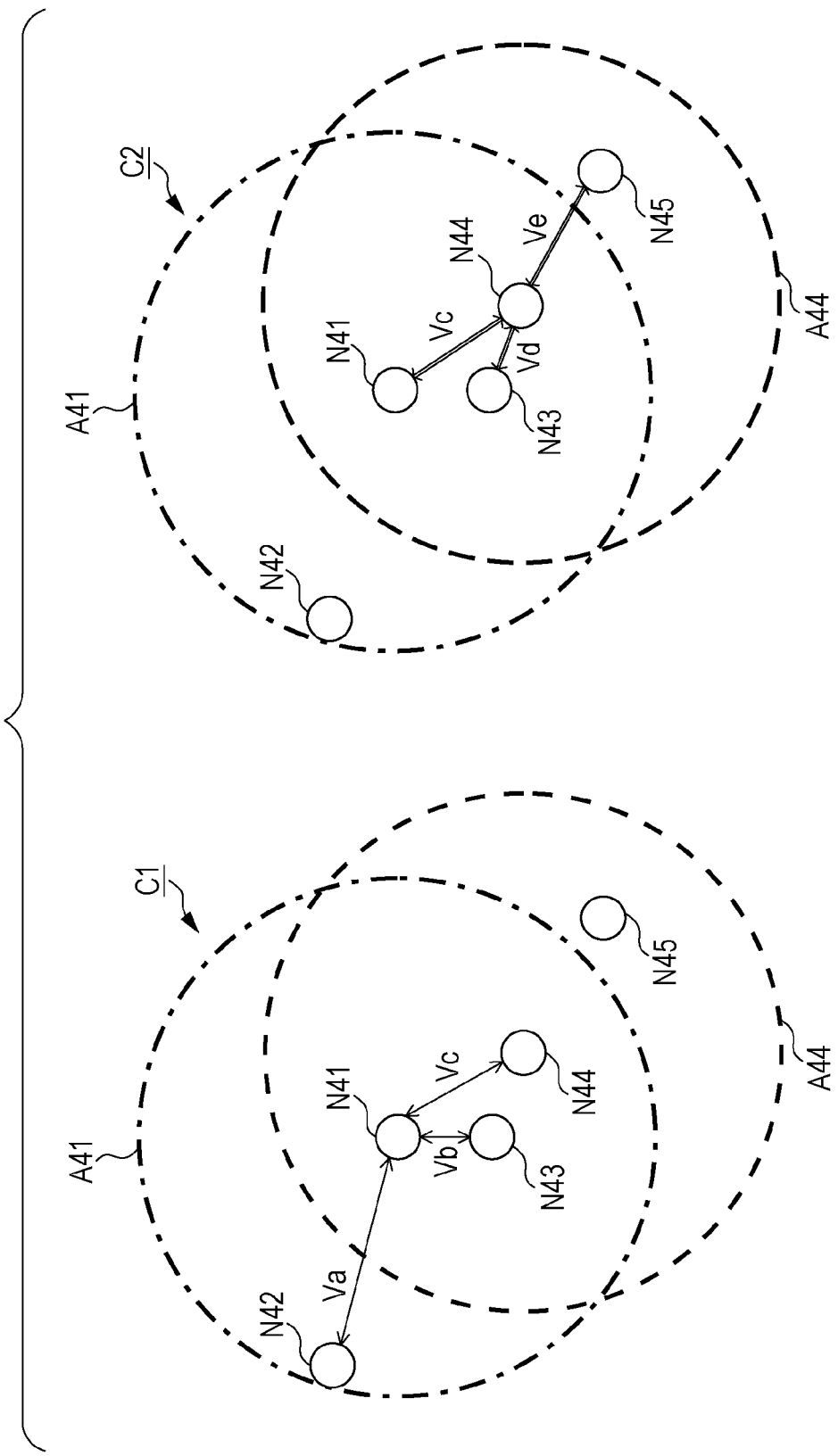
FIG. 10 is a diagram illustrating an example of communication between communication apparatuses which are arranged in a dispersion area.

(1) Communication Apparatus Located in a Dispersion Area, and a Boundary Between the Dense Area and the Dispersion Area FIG. 10 illustrates an example of communication between the communication apparatuses 10 which are installed in the dispersion area. FIG. 10 illustrates an example of communication which is performed in each of a state C1 and a state C2. It is assumed that in either the state C1 or the state C2, the nodes N41 to N45 are included in the dispersion area. In FIG. 10, the range A41 represents a range in which a frame transmitted from the node N41 may be received, and the range A44 represents a range in which a frame transmitted from the node N44 may be received. The adjacent apparatuses of the node N41 are communication apparatuses 10 included in the range A41, and the adjacent apparatuses of the node N44 are communication apparatuses 10 included in the range A44. Accordingly, even in either the state C1 or the state C2, the adjacent apparatuses for the node N41 are nodes N42 to N44, and the adjacent apparatuses for the node N44 are nodes N41, N43, and N45.

It is assumed that the control unit 31_41 of the node N41 is notified that the node N31 is arranged in the dispersion area from the arrangement state specifying unit 32_41. Then, the control unit 31_41 specifies the communication quality between the node N41 and the communication apparatuses 10 adjacent to the node N41, in order to determine the number of times to broadcast a frame from the node N41. At this time, the control unit 31_41 refers to the link table 41_41. In the example of the state C1 in FIG. 10, the communication quality between the respective communication apparatuses 10 is as follows:

communication quality between the node N41 and the node N42: Va communication quality between the node N41 and the node N43: Vb communication quality between the node N41 and the node N44: Vc.

Next, the control unit 31_41 refers to the number-of-times-information 43_41, in order to obtain the number of times of broadcast.

FIG. 11 illustrates an example of number-of-times-information 43. In the number-of-times-information 43, the arrangement and communication quality of the communication apparatus 10 is associated with the number of times of the communication apparatus 10 broadcasting a frame. It is assumed that a common value is set between the communication apparatuses 10 included in the network, with respect to the number-of-times-information 43. As described with reference to FIG. 5, the calculation method of communication quality may vary depending on the implementation, but in the example of FIG. 11, as the value of the communication quality is smaller, it is assumed that the communication quality is good. The number of times of broadcast at each stage is the number of times of transmission of a frame, which is to be obtained in order to set the probability of success in transmission of the frame to a predetermined value or more, with respect to the node apparatus for communication through a path of communication quality that have been classified in the stage.

For example, in the number-of-times-information 43 illustrated in FIG. 11, when the communication apparatus 10 is arranged in a dispersion area, the communication quality is classified into 10 stages using thresholds G1 to G9, and the number of times of broadcast is associated with each stage. In the example of FIG. 11, when the communication quality of the path is better than the communication quality expressed by the threshold G1, even if the number of times of broadcast of a frame is 1, the probability of success in the transmission of the frame is equal to or greater than a predetermined value. Meanwhile, the communication quality of the path is lower than the communication quality expressed by the threshold G8 and better than the communication quality expressed by the threshold G9, the communication apparatus 10 broadcasts the frame nine times, in order to set the probability of success in the transmission of the frame to a predetermined value or more.

The control unit 31_41 obtains the number of times of broadcast corresponding to the quality of communication with the respective adjacent apparatuses. For example, if the values of Va to Vc and the sizes of the thresholds G1 to G9 are compared, it is established that G9<Va,
Vb<G1, and
G1<Vc<G2.

Then, the control unit 31_41 determines that the number of times of broadcast for setting the probability of success in the transmission of a frame to a predetermined value or more is ten, based on the quality of communication with the node N42. Similarly, from number-of-times-information 43, the control unit 31_41 specifies that the number of times of broadcast may be one based on the quality of communication with the node N43 and the number of times of broadcast may be two based on the quality of communication with the node N44. The control unit 31_41 adopts the greatest value among the number of times of broadcast which is obtained using the quality of communication with each adjacent apparatus. Accordingly, in the example of state C1, the control unit 31_41 determines to broadcast a frame ten times.

In this manner, the control unit 31 determines the number of times to broadcast a frame, according to the communication quality of a path with the adjacent communication apparatuses 10. Therefore, when the quality of communication with all the adjacent communication apparatuses 10 is good, the communication apparatus 10 may set the number of times of broadcast to be small.

For example, in the state C2 in FIG. 10, it is assumed that the communication quality between the node N44 and the adjacent apparatus is as follows:

communication quality between the node N44 and the node N41: Vc
communication quality between the node N44 and the node N43: Vd
communication quality between the node N44 and the node N45: Ve.

Here, it is assumed that the Vd is smaller than the threshold G1, G1<Vc<G2, and G1<Ve<G2. Then, the control unit 31_44 specifies that the number of times of broadcast may be one based on the quality of communication with the node N43 and the number of times of broadcast may be two based on the quality of communication with the nodes N41 and 45, using the number-of-times-information 43 (FIG. 11). Thus, the control unit 31_44 determines the number of times of broadcast from the node N44 as 2. In other words, the communication apparatus 10 located in the dispersion area is able to change the number of times of broadcast, corresponding to the quality of a path having a relatively bad communication quality, among the paths with the adjacent apparatuses.

If the number of times of broadcast is determined, the control unit 31 outputs the broadcast frame which is input from the application processing unit 26 to the transmission unit 11 the determined times. The transmission unit 11 broadcasts the frame which is input from the control unit 31.

In addition, here, a case has been described in which the control unit 31 obtains the number of times of broadcast based on the quality of communication with each adjacent apparatus, and sets the maximum value among the obtained numbers to the number of times of broadcast which is performed by the communication apparatus 10, but is an example. For example, if the quality of communication with the adjacent apparatus is acquired, the control unit 31 may determine the worst condition of the communication quality as the standard for determining the number of times of broadcast. For example, in the example of the state C1, the control unit 31_41 uses the communication quality between the node N41 and the node N42 as the standard for obtaining the number of times of broadcast of a frame from the node N41. The control unit 31 may determine the number of times associated with the communication quality which is the standard as the number of times of broadcast by the communication apparatus 10, using the determined standard, with reference to the number-of-times-information 43.

The control unit 31 of the communication apparatus 10 located in the boundary between the dense area and the dispersion area also determines the number of times of broadcast of a frame by the same method as that of the control unit 31 of the communication apparatus 10 arranged in the dispersion area. Therefore, the communication apparatus 10 located in the boundary between the dense area and the dispersion area also is able to change the number of times of broadcast, corresponding to the quality of a path having a relatively bad communication quality. Further, the control unit 31 outputs the broadcast frame to the transmission unit 11 the determined times, and thus the frame is broadcasted the times determined by the control unit 31. Accordingly, the reachability of data is ensured even in the boundary between the dense area and the dispersion area.

(2) Communication Apparatus Arranged in Dense Area

If it is notified that the communication apparatus is arranged in the dense area, the control unit 31 recognizes that there is a possibility that data is propagated to the network by the broadcast from the adjacent apparatus, even if the communication apparatus 10 itself does not broadcast a frame. In other words, in the dense area, data may be propagated to all the communication apparatuses 10 in the network by the selected communication apparatus 10 performing broadcast. Thus, if it is notified that the communication apparatus 10 is located in the dense area, the control unit 31 outputs the frame identifier in the broadcast frame which is input from the application processing unit 26 and the request of the multiplier determination to the setting unit 34.

Figure 12:
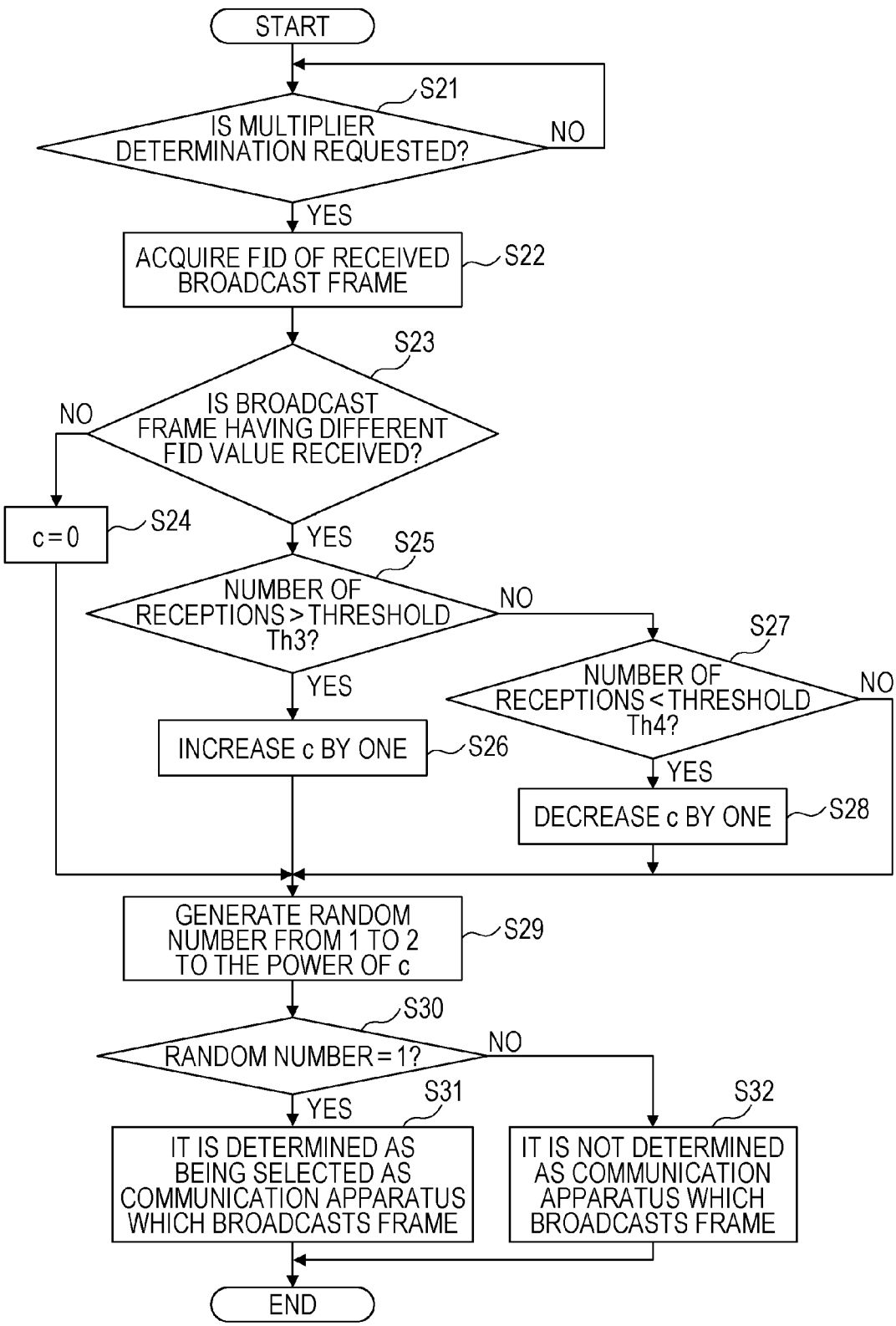
FIG. 12 is a flowchart illustrating an example of a multiplier determination.

FIG. 12 is a flow chart illustrating an example of a multiplier determination. In the process described in FIG. 12, in the calculation of the probability of being selected for the communication apparatus 10 to perform broadcast, a variable c is used. Further, the setting unit 34 uses thresholds Th3 and Th4 in order to adjust the value of the variable c. The threshold Th3 is an upper limit acceptable for the number of times for the reception of one broadcast frame. The threshold Th3 is the upper limit of the number of times that one communication apparatus 10 is able to receive the same broadcast frame within a range in which the occurrence of congestion in a network is not predicted. In contrast, the threshold Th4 is a lower limit acceptable for the number of times for the reception of one broadcast frame. In other words, when the broadcast frame is transmitted as frequently as information may be propagated to an entire network, the threshold Th4 is a lower limit of the number of times that one communication apparatus 10 receives the same broadcast frame.

The setting unit 34 is on standby until the multiplier determination is requested from the control unit 31 (No in step S21). If the multiplier determination is requested, the setting unit 34 acquires the frame identifier (FID) of the broadcast frame that the communication apparatus 10 receives (Yes in step S21, step S22). The setting unit 34 determines there is reception history of the broadcast frame including a FID different from the FID of the broadcast frame to be processed (step S23). When there is reception history of the broadcast frame having a value of the FID different from that of the broadcast frame to be processed, the FID management unit 22 notifies the FID before update and the number of receptions to the setting unit 34, when the update of the broadcast reception table 44. Thus, when the FID and the number of receptions are not notified from the FID management unit 22, the setting unit 34 determines that the communication apparatus 10 first receives the broadcast frame (No in step S23). Thus, the setting unit 34 sets the integer c to 0 (step S24).

Meanwhile, when the FID notified from the FID management unit 22 and the FID notified from the control unit 31 are different, the setting unit 34 determines there is reception history of the broadcast frame attached by the FID different from the FID of the frame to be process (Yes in step S23). Then, the setting unit 34 compares the threshold Th3 with the number of receptions notified from the FID management unit 22 (step S25). When the number of receptions is greater than the threshold Th3, the communication apparatus 10 receives one broadcast frame, more than the number of times allowed as the number of receptions of the same broadcast frame (Yes in step S25). Thus, the setting unit 34 determines there is a high possibility of the occurrence of congestion, and increases the variable c by one in order to lower the probability that communication apparatus 10 broadcasts a frame (step S26).

When the number of receptions recorded in the broadcast reception table 44 is equal to or less than the threshold Th3, the setting unit 34 determines that the possibility of the occurrence of congestion might not ignored (No in step S25). Thus, next, the setting unit 34 compares the number of receptions with the threshold Th4 in order to determine whether communication is being performed to the extent that propagation of data is not impaired (step S27). When the number of receptions is smaller than the threshold Th4, the number of times that the communication apparatus 10 receives one broadcast frame does not reach the number of times that is obtained to ensure the transmissibility of data (Yes in step S27). Thus, the setting unit 34 determines that there is a risk that data might not be propagated to the entire network, and increases the variable c by one in order to increase the probability that the communication apparatus 10 broadcasts the frame (step S28). In addition, when the number of receptions is equal to or greater than the threshold Th4, the number of broadcast frames that are transmitted and received in the network is as many as congestion does not occur and has an amount sufficient for ensuring the transmissibility of data (No in step S27). Accordingly, the multiplier determination processing unit 33 does not change the variable c while it is established that the threshold Th4≤the number of receptions≤the threshold Th3.

If the setting of the variable c is ended, the determination unit 35 generates random numbers in a range between 1 and 2 to the power of c (step S29). In the example of FIG. 12, when the generated random number is 1, the determination unit 35 determines that the communication apparatus 10 itself is selected as the communication apparatus 10 which broadcasts frames (Yes in step S30, step S31). In contrast, when the generated random number is not 1, the determination unit 35 determines that the communication apparatus 10 is not selected as the communication apparatus 10 which broadcasts frames (No in step S30, step S32).

The determination unit 35 notifies the control unit 31 whether the communication apparatus 10 is selected as the communication apparatus 10 which broadcasts frames as a result of the multiplier determination. If a notification of not being selected as an apparatus which broadcasts frames is received from the determination unit 35, the control unit 31 does not broadcast and discards the frame. In contrast, if a notification of being selected as an apparatus which broadcasts frames is received from the determination unit 35, the control unit 31 determines the number of times associated with the communication apparatus 10 included in the dense area as the number of times of broadcast, with reference to the number-of-times-information 43. In the example of FIG. 11, if the communication apparatus 10 arranged in the dense area is selected as an apparatus which broadcasts frames, it is set to broadcast a frame once. Thus, the control unit 31 of the communication apparatus 10 which is selected as an apparatus which broadcasts frames among the communication apparatuses 10 arranged in the dense area outputs the broadcast frame to the transmission unit 11 once. Therefore, the frame is broadcasted from the selected communication apparatus 10 once.

In addition, in FIG. 12, a case in which the communication apparatus 10 having the generated random number of 1 performs broadcast has been described as an example, but it is only an example. In other words, the value used for determining whether the communication apparatus 10 is selected as an apparatus which performs broadcast may be any value between 1 and 2 to the power of c.

As described with reference to FIG. 12, the setting unit 34 adjusts the size of a possibility of the communication apparatus 10 broadcasting a frame, using a comparison result of the number of receptions recorded in the broadcast reception table 44 and the thresholds Th3 and Th4. Here, the number of receptions recorded in the broadcast reception table 44 is the number of times that the communication apparatus 10 receives the same broadcast frame from the adjacent apparatus. Accordingly, as the number of times that the communication apparatus 10 receives the same broadcast frame from the adjacent apparatus is larger, the setting unit 34 determines that there is a high possibility of data being transmitted, even if the communication apparatus 10 itself does not perform broadcast, such that there is a high possibility of not performing broadcast. Therefore, congestion in the network is likely to be avoided.

Figure 13:
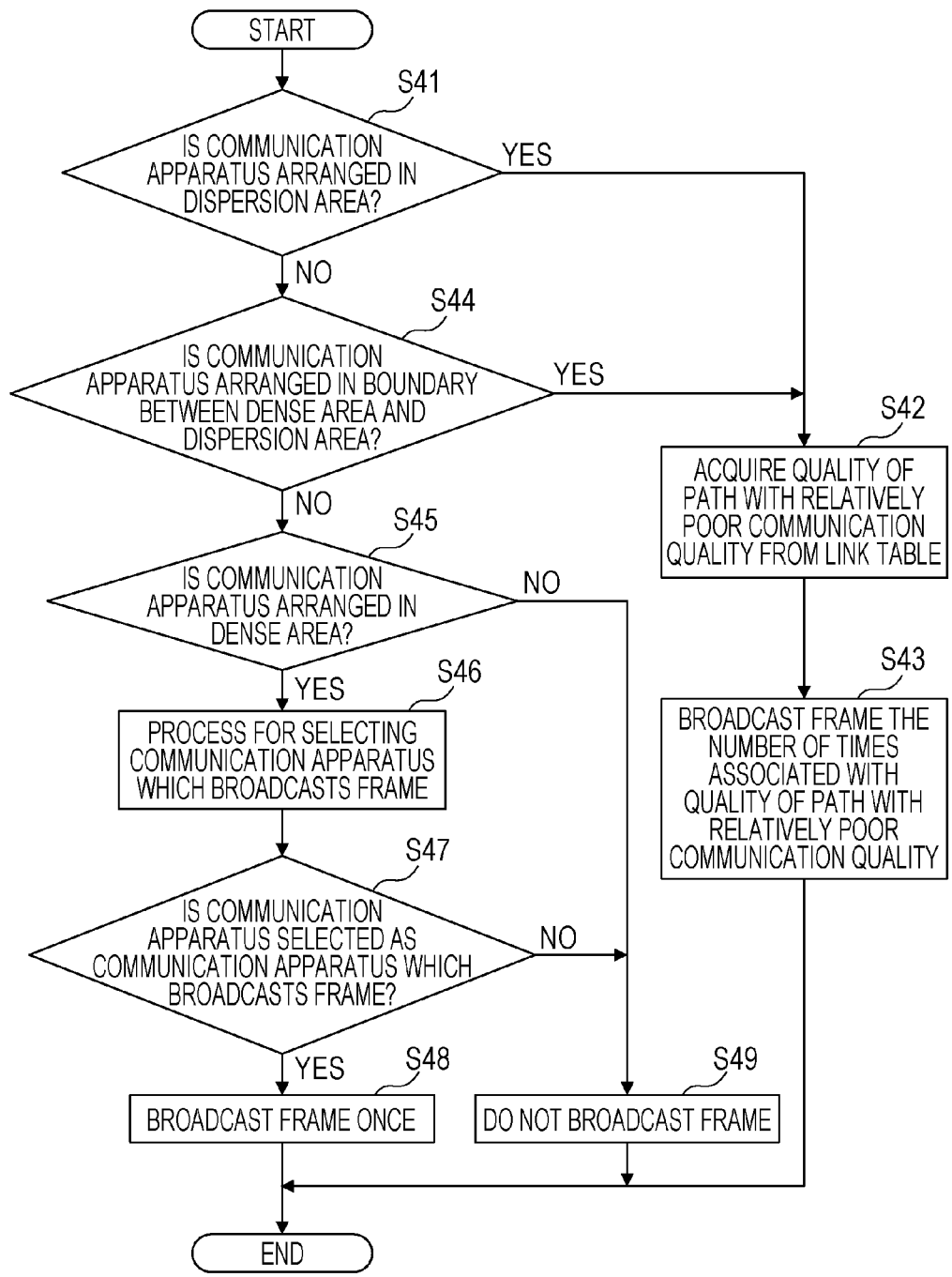
FIG. 13 is a flowchart illustrating an example of a determination method of the number of times of broadcast.

FIG. 13 is a flow chart describing an example of a determination method of the number of times of broadcast. The control unit 31 determines whether it is notified from the arrangement state specifying unit 32 that the communication apparatus 10 is arranged in the dispersion area (step S41). When the communication apparatus 10 is arranged in the dispersion area, the control unit 31 acquires the quality of a path with a relatively poor communication quality among paths between adjacent apparatuses of the communication apparatus 10, from the link table 41 (Yes in step S41, step S42). The control unit 31 acquires the number of times associated with the quality of a path with a relatively poor communication quality from the number-of-times-information 43, and transmits the broadcast frame from the transmission unit 11 the acquired number of times (step S43).

When the communication apparatus 10 is not arranged in the dispersion area, the control unit 31 determines whether it is notified from the arrangement state specifying unit 32 that the communication apparatus 10 is arranged in the boundary between the dense area and the dispersion area (step S44). When it is notified that the communication apparatus 10 is arranged in the boundary between the dense area and the dispersion area is notified, the control unit 31 performs the process in steps S42 and S43 (Yes in step S44, steps S42 and S43).

When the communication apparatus 10 is not arranged in the dispersion area and the boundary between the dense area and the dispersion area, the control unit 31 determines whether it is notified from the arrangement state specifying unit 32 that the communication apparatus 10 is arranged in the dense area (No in step S44, step S45). When the communication apparatus 10 is not arranged in the dense area, the control unit 31 does not broadcast the frame and ends the process (No in step S45, step S49).

When the communication apparatus 10 is not arranged in the dense area, the control unit 31 makes a request of a process for determination whether the communication apparatus 10 is selected as the communication apparatus 10 which broadcasts a frame, to the setting unit 34 (step S46). In addition, the process performed in step S46 is the same as that described with reference to FIG. 12. The determination unit 35 determines whether the communication apparatus 10 is selected as an apparatus which broadcasts a frame (step S47). When the communication apparatus 10 is selected as the apparatus which broadcasts a frame, the control unit 31 controls such that the broadcast is to be performed once (Yes in step S47, step S48). In contrast, when the communication apparatus 10 is not selected as the apparatus which broadcasts a frame, the control unit 31 does not output the broadcast frame to the transmission unit 11 and discards the broadcast frame (No in step S47, step S49).

Figure 14:
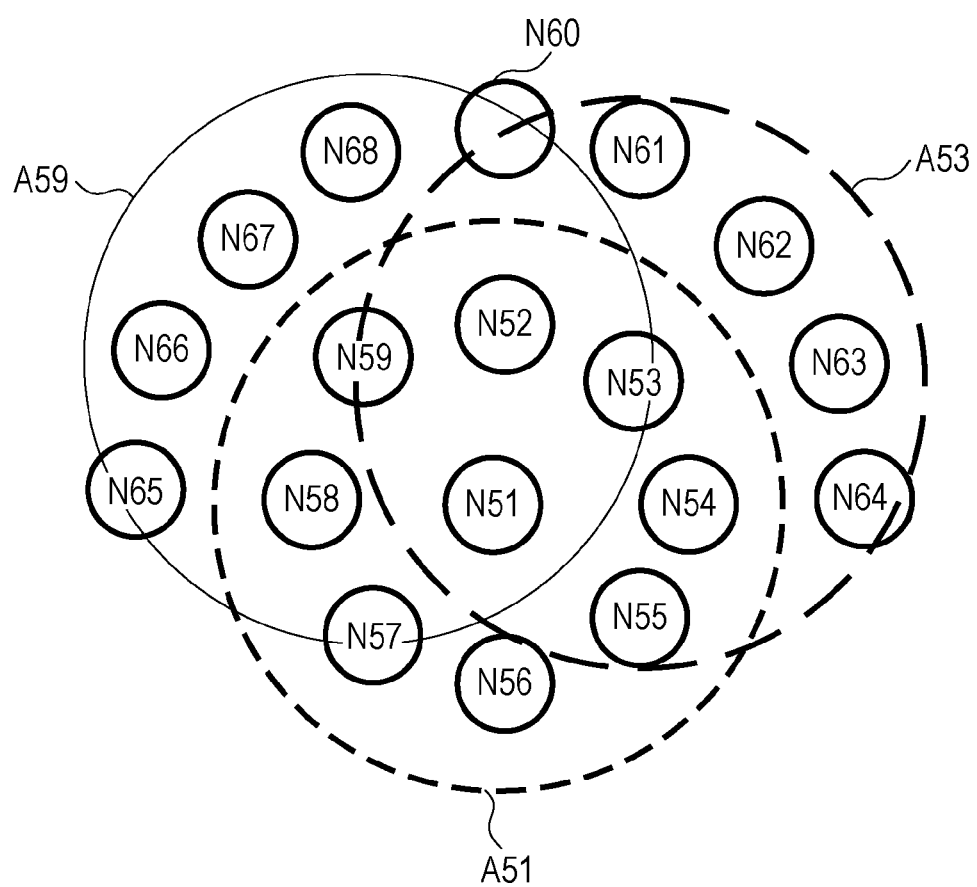
FIG. 14 is a diagram illustrating an example of a dense area.

FIG. 14 illustrates an example of a dense area. An example of an effect of a reduction in the number of frames transmitted and received in the first embodiment will be described with reference to FIG. 14. Nodes N51 to N68 are included in the dense area illustrated in FIG. 14. In FIG. 14, a range A51 represents a range which a frame transmitted from a node N51 reaches. Similarly, a range A53 represents a range which a frame transmitted from a node N53 reaches, and a range A59 represents a range which a frame transmitted from a node N59 reaches. Accordingly, the adjacent apparatuses for the node N51 are nodes N52 to N59. The adjacent apparatuses for the node N53 are nodes N51, N52, N54, N55, and N59 to N64. Further, the adjacent apparatuses for the node N59 are nodes N51 to N53, N57, N58, N60, and N65 to N68.

For example, it is assumed that the nodes N53 and N59 are selected as the communication apparatuses 10 which broadcast the frames which have been broadcasted by the node N51. Then, since the node N51 receives the frame which the node N51 itself has broadcasted, from the nodes N53 and N59, it receives the broadcast frame which has already been transmitted two times. Meanwhile, when the communication apparatuses 10 which broadcast a frame are not selected even in the dense area, the node N51 re-receives the frame which the node N51 itself has broadcasted, form all the adjacent apparatuses of the nodes N52 to N59. Then, the node N51 receives the broadcast frame that the node N51 itself has transmitted, eight times. In this manner, in the first embodiment, it is possible to limit the number of broadcast frames transmitted and received in order to avoid congestion.

Further, in the method according to the first embodiment, it is possible to increase the number of times of broadcast such that the probability of success in the transmission of a frame is a certain value or more in all the adjacent apparatuses, in the communication apparatus 10 which is arranged in the dispersion area or in the boundary between the dense area and the dispersion area.

In this manner, it is possible to ensure the reachability of data while limiting the number of frames transmitted and received in the network, by adjusting the number of times of broadcast by each communication apparatus 10 according to the arrangement. Therefore, it is possible to avoid the occurrence of congestion in the network, while maintaining a status in which data reliably reaches all the communication apparatuses 10 in the network.

Second Embodiment

In the second embodiment, a case in which a broadcast frame is reduced in view of a communication path along which data is delivered in addition to the arrangement of the communication apparatus 10 will be described. In addition, in the second embodiment, it is assumed that the communication apparatus 10 which may be the distribution source of a broadcast frame has been recognized in each communication apparatus 10 in the network. In the following example, a case in which the distribution source of a broadcast frame is a gateway (GW) will be described as an example.

Figure 15:
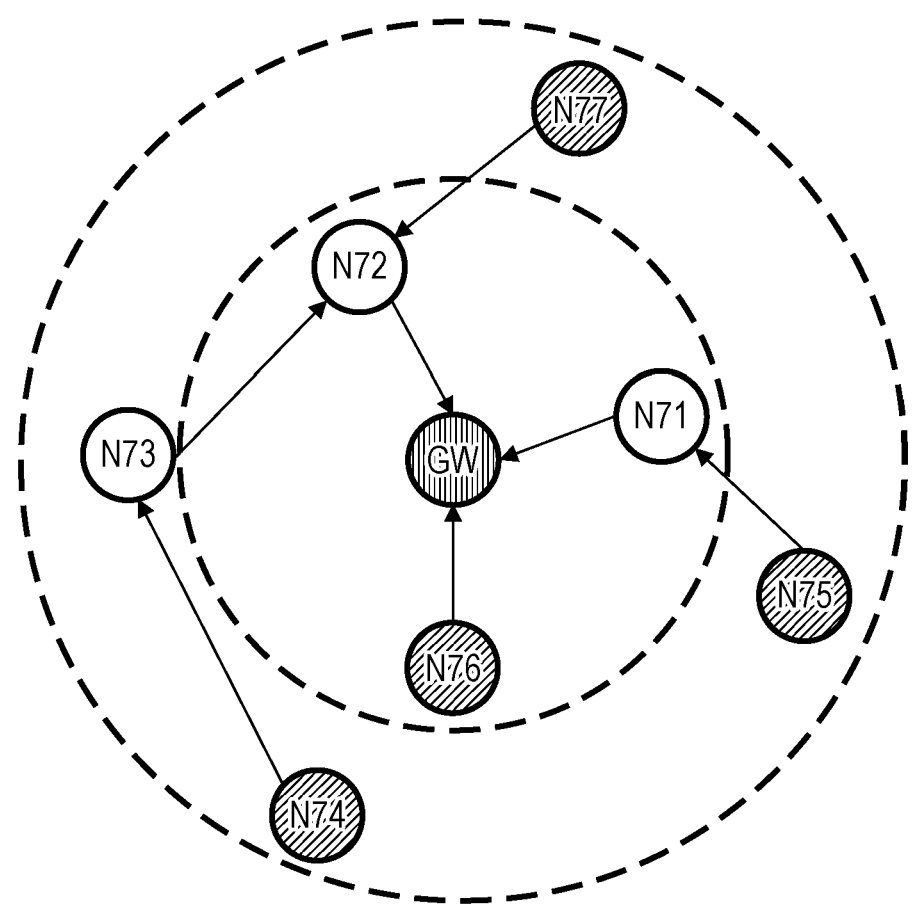
FIG. 15 is a diagram illustrating an example of communication performed on a network.

FIG. 15 illustrates an example of communication which is performed in a network. In each communication apparatus 10 in the network, a communication path to the communication apparatus 10 operating as the GW is established. FIG. 15 illustrates transmission paths when the communication apparatuses 10 in the network transmit data to the GW. In the example of FIG. 15, the node N74 transmits a frame to the GW through nodes N73 and N72. Similarly, the node N77 transmits a frame to the GW through a node N72, and the node N75 transmits a frame to the GW through a node N71. Further, the nodes N76, N71, and N72 directly transmit frames to the GW.

When the communication paths are used as FIG. 15, it is assumed that the communication path to each communication apparatus 10 from the GW is a path in a reverse direction of an arrow in FIG. 15. For example, the GW is able to transmit a frame to a node N74 through nodes N72 and N73. In this case, there is a possibility that the final destination of the frame that the node N72 receives from the GW is any of nodes N72 to N74, and N77. Meanwhile, in the communication apparatus 10 located in the end of the communication path of a GW-addressed frame, a frame to be transmitted to another communication apparatus 10 is not included in a reception frame in which the GW is the global source. That is, since a frame in which the global source is set to the GW is transmitted in a reverse direction to the path illustrated in FIG. 15, for example, the frame that the node N74 receives is limited to a frame in which the node N74 is set to a final destination. Similarly, the nodes N75 to N77 do not transmit the reception frame in which the global source is the GW to another communication apparatus 10. In other words, even if the communication apparatus 10 located in the end of the communication path of the GW-addressed frame does not transmit the frame in which the global source is the GW to another communication apparatus 10, information notified from the GW to all the communication apparatuses 10 in the network may be propagated.

Thus, in the second embodiment, whether each communication apparatus 10 relays the GW-addressed frame is determined, and the communication apparatus 10 which does not relay the GW-addressed frame does not broadcast a frame including information which is delivered from the GW. In the second embodiment, similarly to the first embodiment, since the number of times of broadcast is adjusted by the arrangement and then the communication apparatus 10 located in the end of the communication path to the GW does not perform broadcast, it is possible to further reduce the number of frames transmitted and received in the network.

Hereinafter, an example of a process of the communication apparatus 10 in the second embodiment will be described. Even in the second embodiment, the configuration of the communication apparatus 10 is the same as that in the first embodiment, but the storage unit 40 further holds a GW-addressed frame reception record 45.

If a frame is input from the frame distribution unit 23, the transmission processing unit 25 appropriately specifies a transmission destination of a frame, with reference the routing table 42. At this time, the transmission processing unit 25 determines whether the global destination is the GW in addition to the specification of the transmission destination. If the global destination of the frame subjected to the transmission process is the GW, the transmission processing unit 25 generates or updates the GW-addressed frame reception record 45. The transmission processing unit 25 transmits the frame to the specified destination.

An example of a GW-addressed frame reception record 45 is illustrated in FIG. 16. A fact that the distribution source of the data which is propagated using a broadcast frame is a gateway, the presence or absence of the transmission performance of the gateway-addressed frame, an elapsed time after transmission is performed are recorded in the GW-addressed frame reception record 45. The transmission processing unit 25 sets an elapsed time to zero whenever the distribution source-addressed (GW-addressed) frame is received. If the elapsed time exceeds a predetermined threshold, the transmission processing unit 25 removes the transmission performance. For example, if the threshold is 24 hours and 24 hours has elapsed after the GW-addressed frame is last transmitted, the transmission processing unit 25 changes the value of the transmission performance in the GW-addressed frame reception record 45 from "presence" to "absence", and then initializes the elapsed time. In addition, FIG. 16 illustrates an example of the GW-addressed frame reception record 45, and for example, the time to transmit the GW-addressed frame instead of the elapsed time may be recorded in the GW-addressed frame reception record 45. In this case, if a predetermined time has elapsed from the transmission time of the GW-addressed frame, the transmission performance to the distribution source is removed.

The process of a frame addressed to the communication apparatus 10 itself and the reception process of a broadcast frame are the same as those in the first embodiment. Accordingly, the application processing unit 26 in the communication apparatus 10 which receives the broadcast frame outputs the broadcast frame to the control unit 31 similarly to the first embodiment. If the broadcast frame is input, the control unit 31 makes a request of arrangement specification to the arrangement state specifying unit 32, similarly to the first embodiment.

Figure 17:
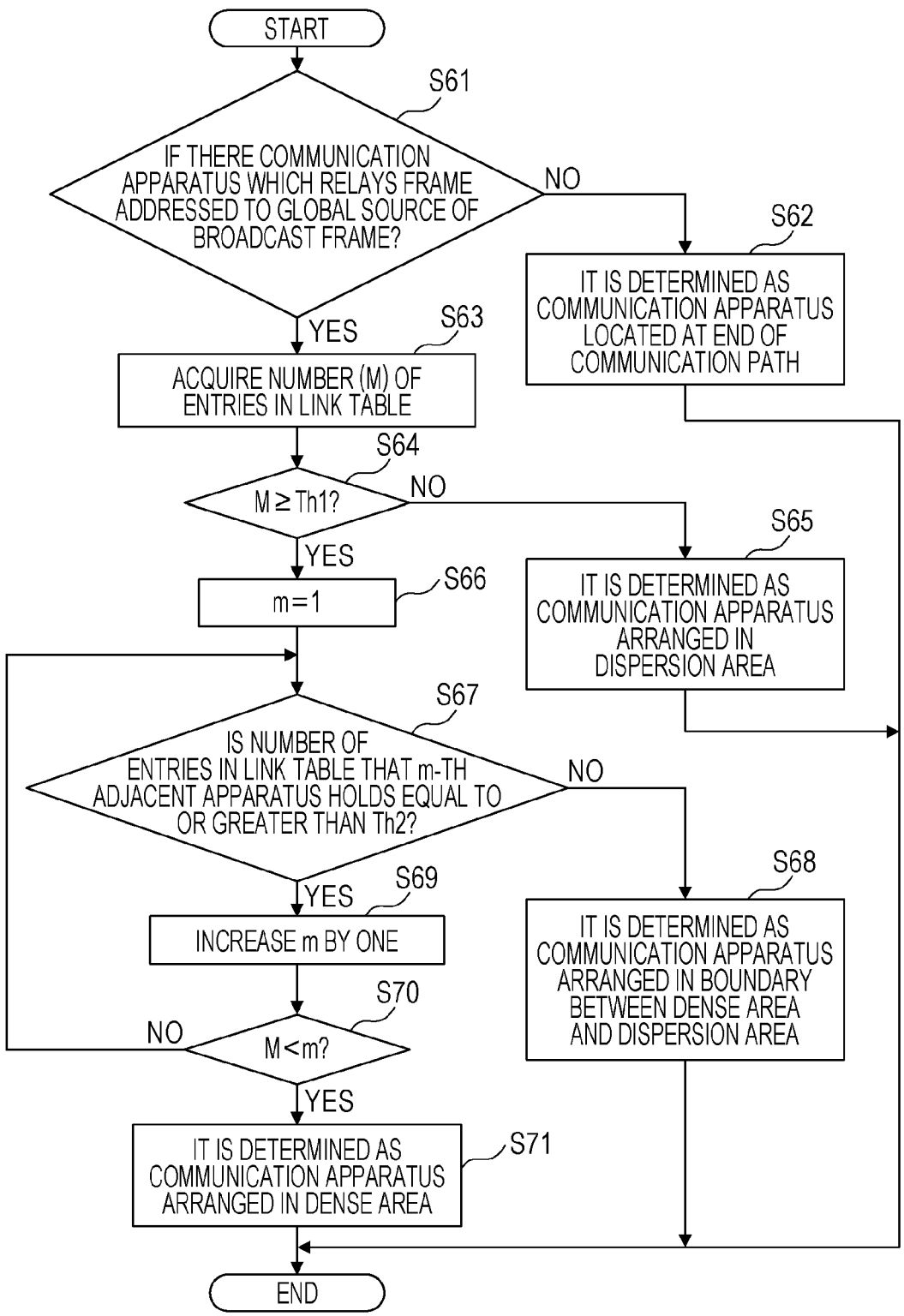
FIG. 17 is a flowchart illustrating an arrangement specification method in a second embodiment.

FIG. 17 is a flow chart illustrating an example of an arrangement specification method in the second embodiment. If the specification of arrangement is requested, the arrangement state specifying unit 32 determines whether there is a performance of transmitting a frame addressed to the global source (the distribution source) of the broadcast frame (step S61). Here, since the apparatus which is the global source of the broadcast frame is the gateway, the arrangement state specifying unit 32 determines whether there is a transmission performance of the gateway-addressed frame, using the GW-addressed frame reception record 45. When there is no performance of transmitting the gateway-addressed frame, the arrangement state specifying unit 32 determines that the communication apparatus 10 is arranged in the end of the communication path and notifies the determination result to the control unit 31 (step S62). In contrast, when there is performance of transmitting the gateway-addressed frame, the arrangement state specifying unit 32 performs the process of step S63 to S71. The process of step S63 to S71 is the same as that of step S1 to S9 described with reference to FIG. 9. In other words, in the second embodiment, the arrangement state specifying unit 32 classifies the arrangement of the communication apparatus 10 into four types including an end of a communication path, a dispersion area, a dense area, and a boundary between the dispersion area and the dense area.

Figure 18:
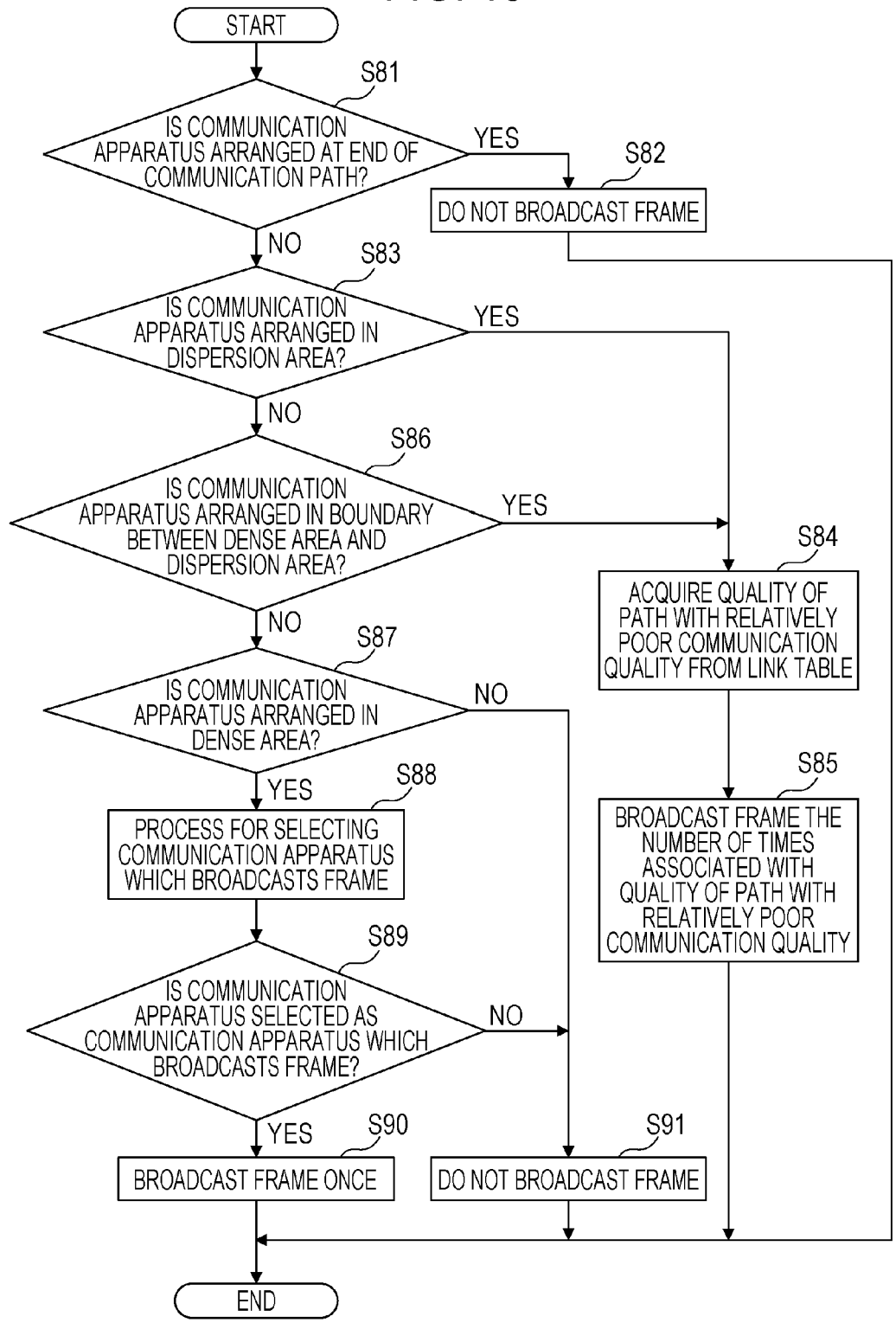
FIG. 18 is a flowchart illustrating an example of a determination method of the number of times of broadcast in the second embodiment.

FIG. 18 is a flow chart describing an example of a determination method of the number of times of broadcast in the second embodiment. If the arrangement is notified from the arrangement state specifying unit 32, the control unit 31 determines the number of times of broadcast in a sequence illustrated in FIG. 18. The control unit 31 determines whether the communication apparatus 10 arranged in the end of the communication path (step S81). When the communication apparatus 10 is arranged in the end of the communication path, the control unit 31 does not broadcast and discards a frame instead of broadcasting (Yes in step S81, step S82). When it is determined that the communication apparatus 10 is not arranged in the end of the communication path, the process of step S83 to S91 is performed. The process of step S83 to S91 is the same as the process of step S41 to S49 described with reference to FIG. 13. Therefore, according to the second embodiment, the communication apparatus 10 located in the end of the communication path and the communication apparatus 10 which is not selected as an apparatus which broadcasts a frame in the dense area do not broadcast a frame.

In the second embodiment, even if the communication apparatus 10 is arranged in any position in a network, if the communication apparatus 10 does not relay a frame addressed to the distribution source of the broadcasted data, the communication apparatus 10 does not broadcast the frame. Therefore, for example, even if the communication apparatus 10 is located in the vicinity of the GW or the communication apparatus 10 has a large number of adjacent apparatuses as the node N76 in FIG. 15, the communication apparatus 10 does not broadcast a frame in some cases. As a result, it is possible to reduce the number of frames transmitted and received in a network while maintaining the reachability of data.

Third Embodiment

In the third embodiment, a case in which the number of broadcast frames transmitted and received is further reduced in view of the propagation direction of data to be broadcast will be described. Further, even in the third embodiment, similarly to the second embodiment, it is assumed that each communication apparatus 10 in the network recognizes in advance that the distribution source of data included in the broadcast frame is a gateway. In addition, even in the third embodiment, a frame addressed to the communication apparatus 10 itself and a process of the broadcast frame are the same as those in the first embodiment.

Figure 19:
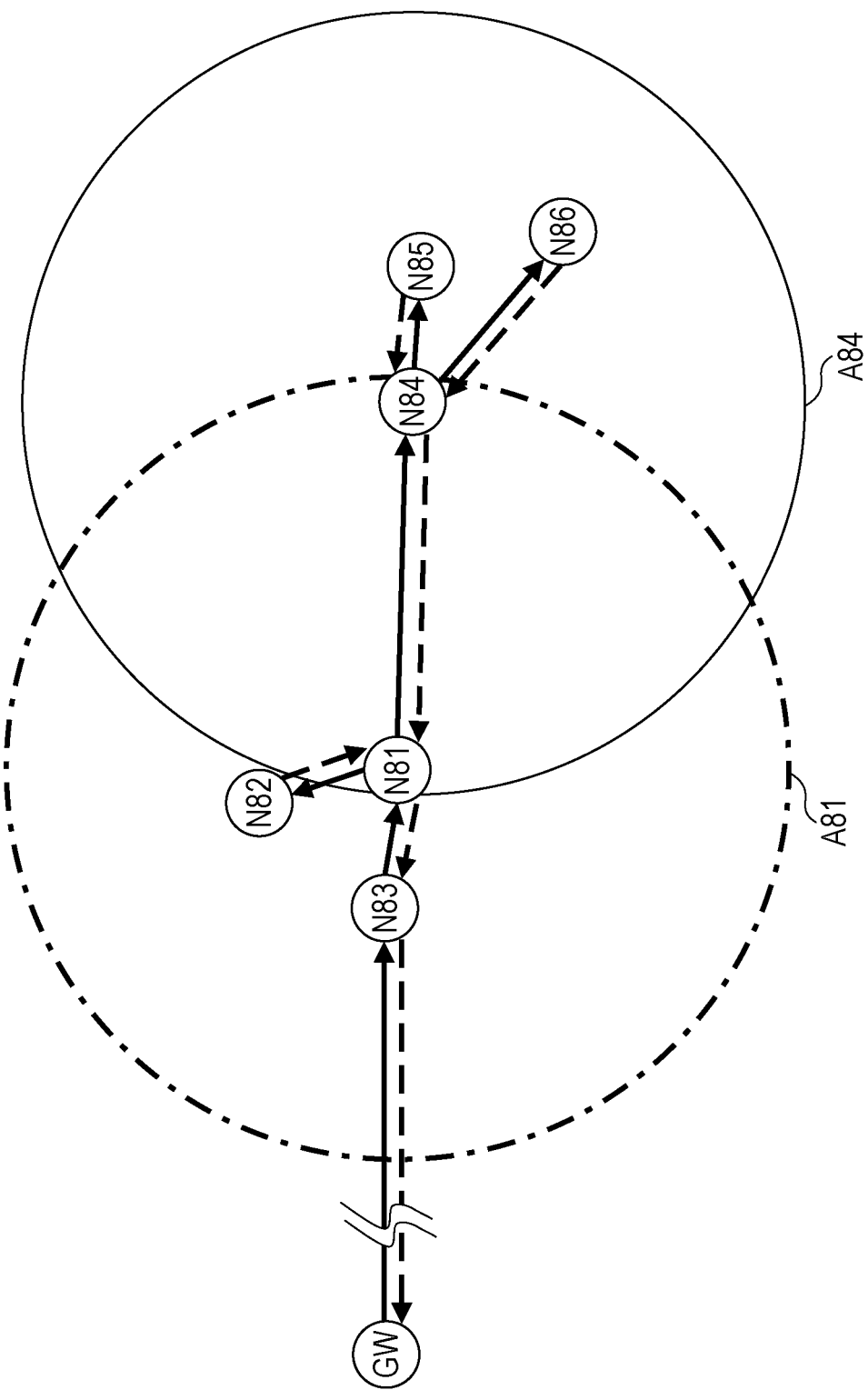
FIG. 19 is a diagram illustrating an example of communication performed on a network.

FIG. 19 illustrates an example of communication performed in the dispersion area in the network. A range A81 represents a range in which frames transmitted from a node N81 are received, and a range A84 represents a range in which frames transmitted from a node N84 are received. Accordingly, the adjacent apparatuses of the node N81 are communication apparatuses 10 included in the range A81, and the adjacent apparatuses of the node N84 are communication apparatuses 10 included in the range A84. In other words, the adjacent apparatuses for the node N81 are nodes N82 to N84 and the adjacent apparatuses for the node N84 are nodes N81, N85, and N86. Further, in FIG. 19, the dashed arrows indicate examples of paths used when the node N81 to N86 transmit data frames to the gateway. The solid arrows are paths in the direction opposite to the dashed arrows, and are used when the gateway transmits data to the nodes N81 to N86. In addition, if a frame that each communication apparatus 10 uses for acquisition of data is transmitted along the paths illustrated by solid lines of FIG. 19, among the broadcast frames in which the gateway is the distribution source, the frame is able to reach all the communication apparatuses 10 in the network.

In the third embodiment, when the global destination of a frame to be transmitted is a gateway, the transmission processing unit 25 specifies the transmission destination and also extracts the local source (LS) of the frame to be transmitted. The extracted local source and a reception history of the gateway-addressed frame are recorded in a GW-addressed frame reception record 46.

FIG. 20 illustrates an example of the GW-addressed frame reception record 46 used in the third embodiment. As illustrated in FIG. 20, in the third embodiment, it is assumed that the communication apparatus 10 includes the GW-addressed frame reception record 46, instead of the GW-addressed frame reception record 45 (FIG. 16). For example, if the node N81 receives a gateway-addressed data frame from the node N84, and generates an entry of No. 1 of a GW-addressed frame reception record 46_81. Similarly, if the node N81 receives a gateway-addressed data frame from the node N82, and generates an entry of No. 2 of the GW-addressed frame reception record 46_81. The transmission processing unit 25 performs a transmission process of a frame concurrently with the generation of the GW-addressed frame reception record 45. The node N84 also processes the reception frame in the same manner as the node N81. Therefore, the node N84 generates the GW-addressed frame reception record 46_84, using the gateway-addressed data frame received from each of the node N85 and the node N86. In addition, it is assumed that even in any entry, when the entry is generated, the elapsed time from the reception of the GW-addressed frame is set to 0.

Since the process when the communication apparatus 10 receives the broadcast frame is the same as in the first and second embodiments, a process regarding the transmission of a broadcast frame is requested from the application processing unit 26 to the control unit 31. If it is notified from the arrangement state specifying unit 32 that the communication apparatus 10 is arranged in the dispersion area, the control unit 31 specifies the local source of the gateway-addressed frame which has been relayed up to then, in order to determine the number of times of broadcast of a frame. Here, an apparatus, which is the local source of the gateway-addressed frame which is relayed by the communication apparatus 10, uses a path through the communication apparatus 10 in order to perform communication with the gateway. In other words, if the apparatus, which is the local source of the gateway-addressed frame which is relayed by the communication apparatus 10, does not receive the broadcast frame from the communication apparatus 10, there is a possibility that the broadcast frame might not be received from the other paths. Thus, in the third embodiment, the control unit 31 determines the number of times of broadcast of a frame, according to the quality of a path to an apparatus in which the communication quality of a path to the communication apparatus 10 is relatively bad, among the local sources of the gateway-addressed frames which have been relayed up to then.

For example, it is notified the control unit 31_81 that the node N81 of FIG. 19 is arranged in the dispersion area. Then, the control unit 31_81 specifies a path having the worst quality to the node N81 among the adjacent apparatuses recorded in the GW-addressed frame reception record 46_81 (FIG. 20) as the LS of the gateway-addressed frame, in order to determine the number of times of broadcast. In other words, the control unit 31_81 determines whether the quality of a path to any of the nodes N82 and N84 among the adjacent apparatuses of the node N81 is worse, by referring to the GW-addressed frame reception record 46_81 and the link table 41_81. Here, it is assumed that the quality of a path between the node N81 and the node N84 is worse than the quality of a path between the node N81 and the node N82. Then, the control unit 31_81 determines the number of times of broadcast, according to a result obtained by comparing the quality of a path between the node N81 and the node N84 with the thresholds G1 to G9 included in the number-of-times-information 43 (FIG. 11).

Next, an example of a process in the node N84 has been described. It is assumed that the arrangement state specifying unit 32_84 determines that the node N84 is arranged in the dispersion area. Then, the control unit 31_84 specifies that the transmission sources (LS) of the gateway-addressed frames which the node N84 has relayed are nodes N85 and N86, by referring to the GW-addressed frame reception record 46_84 (FIG. 20). Thus, the control unit 31_84 determines the number of times of broadcast by the node N84, according to a worse path among a path between the node N84 and the node N85 and the path between the node N84 and the node N86.

In the example illustrated in FIG. 19, among paths between the node N84 and the adjacent apparatus of the node N84, the path having the worst communication quality is a path between the node N81 and the node N84. However, since there is no a node N81 in the GW-addressed frame reception record 46_84 (FIG. 20), the control unit 31_84 determines that the node N84 is not included in the communication path between the node N81 and the gateway. Thus, the control unit 31_84 is able to determine the number of times of broadcast, without being influenced by the state of the path between the node N81 and the node N84. That is, the control unit 31_84 is able to determine the number of times of broadcast according to the quality of the path to the communication apparatus 10 including the node N84 in the communication path to the gateway.

Although the process in the communication apparatus 10 arranged in the dispersion area has been described with reference to FIG. 19 and FIG. 20, the communication apparatus 10 arranged in the boundary between the dispersion area and the dense area also determines the number of times of broadcast similarly to the communication apparatus 10 arranged in the dispersion area.

Figure 21:
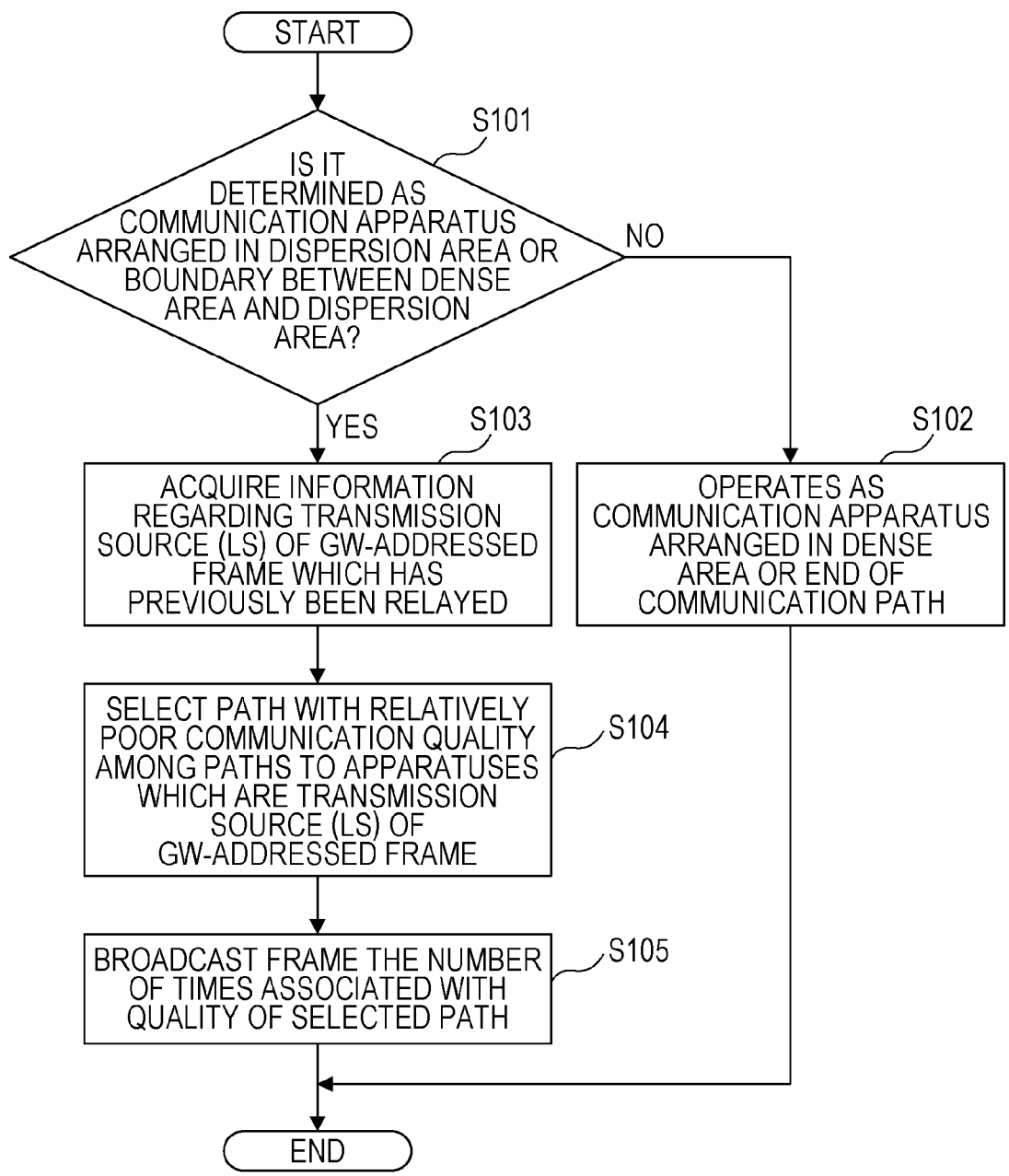
FIG. 21 is a flowchart illustrating an example of a process of a control unit in the third embodiment.

FIG. 21 is a flow chart illustrating an example of a process of the control unit 31 in the third embodiment. The control unit 31 determines whether the arrangement notified from the arrangement state specifying unit 32 is the dispersion area or a boundary between the dispersion area and the dense area (step S101). When the communication apparatus is not arranged in the dispersion area and also in the boundary between the dispersion area and the dense area, the control unit 31 performs a process of processing the communication apparatus as the communication apparatus 10 located in the dense area or the end of the communication path (No in step S101, step S102). In addition, a method of determining the number of times of broadcast with respect to the communication apparatus 10 located in the dense area or the end of the communication path is the same as those of the first and second embodiments.

When the dispersion area is arranged in a boundary between the dispersion area and the dense area, the control unit 31 acquires information of the local source of the previously relayed gateway-addressed frame, using the GW-addressed frame reception record 46 (Yes in step S101, step S103). The control unit 31 selects a path having a relatively worse communication quality, among paths to the communication apparatuses 10 which have been the local sources of the previously relayed gateway-addressed frame (step S104). The control unit 31 acquires the number of times of broadcast associated with the communication quality of the selected path, by comparing the communication quality of the selected path with the threshold included in the number-of-times-information 43 (step S105). The control unit 31 broadcasts the frame the acquired number of times.

In this manner, according to the third embodiment, the communication apparatus 10 located in the dispersion area or the boundary between the dispersion area and the dense area adjusts the number of times of broadcast in order to transmit a broadcast frame to the communication apparatuses 10 which relay the gateway-addressed frame. Therefore, when the communication apparatus 10 is not included in a communication path between the adjacent apparatus and the gateway, the communication apparatus 10 is able to determine the number of times of broadcast, without being influenced by the state of the path to the adjacent apparatus. In other words, when the communication apparatus 10 is not included in the communication path between the adjacent apparatus and the gateway, even if the quality of a communication path between the adjacent apparatus and the communication apparatus 10 is bad, if the state of another path is good, the communication apparatus 10 does not increase the number of times of broadcast. Therefore, the number of broadcast frames transmitted and received in the network is reduced.

Fourth Embodiment

In the fourth embodiment, a method of optimizing the number of times of broadcast with respect to a case in which the transmission and reception of data frame is used for communication addressed to the communication apparatus 10 in the network from the gateway and communication addressed to the gateway from each communication apparatus 10 will be described. In the fourth embodiment, the communication apparatus 10 arranged in the boundary between the dispersion area and the dense area is classified into two groups including an apparatus of transmitting the broadcast frame from the dense area to the dispersion area and an apparatus of transmitting the broadcast frame from the dispersion area to the dense area. Hereinafter, with respect to the fourth embodiment, an acquisition of information used for determining an arrangement, a determination of an arrangement, and a determination of the number of times of broadcast will be described separately.

Acquisition of Information Used for Determining Arrangement

In the fourth embodiment, the communication apparatus 10 holds relay information 47 in addition to the GW-addressed frame reception record 46. The relay information 47 includes the local sources of data frames which the communication apparatus 10 have transmitted to communication apparatuses 10 other than the gateway, and time elapsed from the time at which the communication apparatus 10 last relays a frame transmitted from the local source. In the fourth embodiment, the transmission processing unit 25 not only specifies the transmission destination with respect to the frame to be transmitted but also extracts the local source (LS) of a frame to be transmitted. The transmission processing unit 25 records information regarding the local source extracted from a frame in which the global destination is a gateway and a reception history of the gateway-addressed frame in the GW-addressed frame reception record 46. In contrast, the transmission processing unit 25 records the information regarding the local source extracted from a frame of which the global destination is not gateway, in the relay information 47. In other words, it may be said that the relay information 47 is a list of adjacent apparatuses which are able to transmit frames including information notified from the gateway, to the communication apparatus 10. In addition, it may be said that the GW-addressed frame reception record 46 is a list of adjacent apparatuses of an apparatus to which communication apparatus 10 transmits a frame including information notified from the gateway. Therefore, a path without including a path between the communication apparatus 10 and any of local sources recorded either in the GW-addressed frame reception record 46 or in the relay information 47 is not used for transmission and reception of a data frame.

FIG. 22 illustrates example of the GW-addressed frame reception record 46 and the relay information 47. For example, a node N93 in a network illustrated in a case C3 of FIG. 22 receives a gateway-addressed data frame from a node N94. At this time, in the address which is set in the data frame that the node N93 receives from the node N94, the gateway is set as the global destination, and the node N94 is set as the local source. Thus, the transmission processing unit 25_93 of the node N93 generates a GW-addressed frame reception record 46_93 (FIG. 22), based on the address information and reception time of a data frame which is received from the node N94. Further, it is assumed that the node N93 receives data frames F1 to F3. Here, it is assumed that the address information of the data frames F1 to F3 is as follows:

```
data frame F1
    global source address:        GW
    global destination address:   node N97
    local source address:         node N90
data frame F2
    global source address:        GW
    global destination address:   node N98
    local source address:         node N92
data frame F3
    global source address:        GW
    global destination address:   node N99
    local source address:         node N91
```

When the data frame F1 is transmitted, the transmission processing unit 25_93 recognizes that the final destination of the data frame F1 is the node N97, and the transmission source of the data frame F1 is the node N90. Thus, the transmission processing unit 25_93 generates the entry No. 1 of the relay information 47_93, based on a face that the path between the node N93 and the node N90 is used for transmitting and receiving a data frame. Similarly, the transmission processing unit 25_93 generates the entry No. 2 of the relay information 47_93 based on the data frame F2, and generates the entry No. 3 of the relay information 47_93 based on the data frame F3.

In contrast, it is assumed that the node N96 receives the gateway-addressed data frame from the node N98 and the node N99, and the node N99 receives the data frame which is designated to the global destination from the node N95. Then, the transmission processing unit 25_96 generates the GW-addressed frame reception record 46_96, based on the gateway-addressed data frame. Further, the transmission processing unit 25_96 generates the entry No. 1 of the relay information 47_96, using the data frame in which the node N99 is designated to the global destination.

Other communication apparatuses 10 also generate the GW-addressed frame reception record 46 and the relay information 47, similarly to the nodes N93 and N96. In addition, it is assumed that if a predetermined time has elapsed after the frame received from the local source associated with an entry is last relayed, the information of the relay information 47 is removed by the transmission processing unit 25.

Further, any communication apparatus 10 in the network also generates the link table 41 and the routing table 42 similarly to the first embodiment. FIG. 23 illustrates examples of a link table 41_93 that the node N93 holds and the link table 41_96 that the node N96 holds.

Determination of Arrangement

Hereinafter, a determination method of an arrangement for the communication apparatus 10 which is determined to be arranged neither at the end of a path nor in the dispersion area will be described. In addition, even in the fourth embodiment, the specification method of the communication apparatus 10 which is located at the end of a path is the same as in the second embodiment. Further, the specification method of the communication apparatus 10 which is located in the dispersion area is the same as in the first and second embodiments.

When there is a relay performance of the gateway-addressed frame and the number of adjacent apparatuses exceeds the threshold Th1, the arrangement state specifying unit 32 acquires a list of local destinations included in the GW-addressed frame reception record 46. Here, the local destinations included in the GW-addressed frame reception record 46 are adjacent apparatus to which the communication apparatus 10 provides data delivered from the gateway. For example, the arrangement state specifying unit 32_93 of the node N93 specifies that the node N93 provides data to the node N94 from the gateway, by referring to the GW-addressed frame reception record 46_93.

Next, the arrangement state specifying unit 32 acquires the number of adjacent apparatuses of the communication apparatus 10 which is a providing destination of data delivered from the gateway, from the link table 41. When the number of adjacent apparatuses of the providing destination of data delivered from the gateway is less than the threshold Th2, the arrangement state specifying unit 32 determines that the communication apparatus 10 transmits data delivered from the gateway to the dispersion area. When there is a plurality of providing destinations of data delivered from the gateway, if the number of adjacent apparatuses even in one providing destination is less than the threshold Th2, the arrangement state specifying unit 32 determines that the frame from the gateway is transmitted to the dispersion area. For example, in a case of the node N93, it is specified by referring to the link table 41_93 that the number of adjacent apparatuses for the node N94 is two. Here, in a case of "threshold Th2=3", the arrangement state specifying unit 32_93 determines that the node N93 is the communication apparatus 10 which transmits the data delivered from the gateway to the dispersion area.

Meanwhile, in a case of the node N96, the arrangement state specifying unit 32_96 specifies that the node N96 provides data delivered from the gateway to the node N99 and the node N98, by referring to the GW-addressed frame reception record 46_96. Further, the communication apparatus 10 of any of the nodes N98 and N99 also specifies that the number of adjacent apparatuses exceeds the threshold Th2, by referring to the link table 41_96 (FIG. 23). Then, the arrangement state specifying unit 32_96 determines that the node N96 does not transmit the data delivered from the gateway to the apparatus arranged in the dispersion area.

If the node N94 is determined not to the communication apparatus 10 which transmits the data delivered from the gateway to the dispersion area, the arrangement state specifying unit 32 acquires a list of local destinations included in the relay information 47. Here, the local destinations included in the relay information 47 are adjacent apparatuses which provide data delivered from the gateway to the communication apparatus 10. For example, the arrangement state specifying unit 32_96 specifies that the node N95 provides the data delivered from the gateway to the node N96, by referring to the relay information 47_96 (FIG. 22).

Next, the arrangement state specifying unit 32 acquires the number of adjacent apparatuses for an apparatus which has transmitted data delivered from the gateway, from the link table 41. When the number of adjacent apparatuses of the apparatus which has transmitted data delivered from the gateway is less than the threshold Th2, the arrangement state specifying unit 32 specifies that the communication apparatus 10 receives the data from the gateway from an apparatus in the dispersion area and transmits the data to the dense area. In addition, if the number of adjacent apparatuses is less than the threshold Th2 in at least one among apparatuses which have transmitted the data delivered from the gateway, the arrangement state specifying unit 32 determines that the communication apparatus 10 receives the data delivered from the gateway from an apparatus arranged in the dispersion area, and transmits the data to an apparatus arranged in the dense area. For example, in a case of the node N96, the number of adjacent apparatuses for the node N96 is specified to two, by referring to the link table 41_96 (FIG. 23). Since threshold Th2=3, the arrangement state specifying unit 32_96 determines the node N96 to be a communication apparatus 10 which acquires the data delivered from the gateway, from an apparatus arranged in the dispersion area, and transmits the data to an apparatus arranged in the dense area.

In addition, the arrangement state specifying unit 32 determines that a communication apparatus 10 which is neither the communication apparatus 10 which transmits the data delivered from the gateway to the dispersion area nor the communication apparatus 10 which transmits the data acquired from an apparatus arranged in the dispersion area to an apparatus arranged in the dense area.

Figure 24:
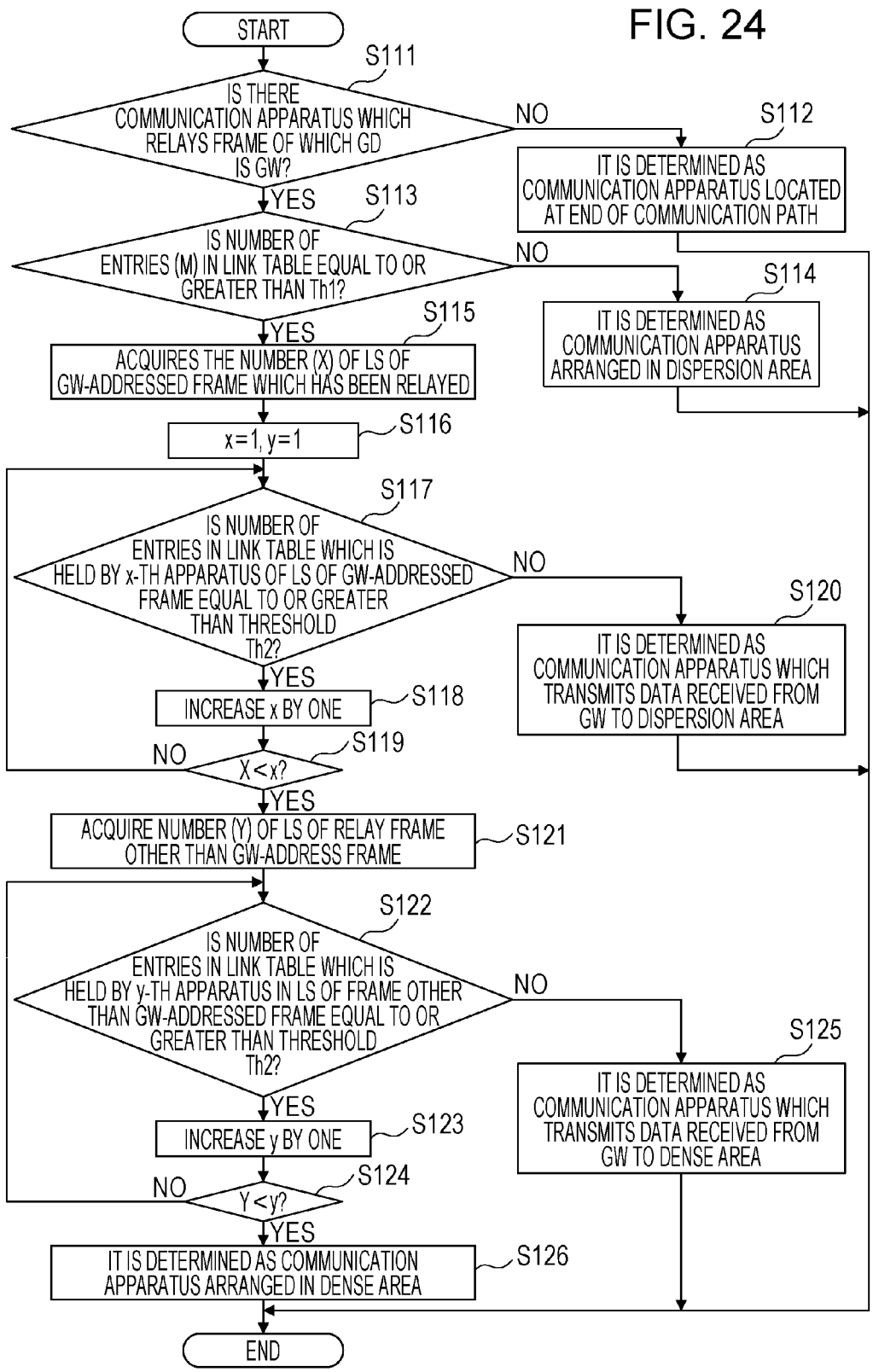
FIG. 24 is a flowchart illustrating an example of an arrangement specification method in a fourth embodiment.

FIG. 24 is a flow chart illustrating an example of a specification method of arrangement in the fourth embodiment. In the example of FIG. 24, integers X, Y and variable x, y are used. The integer X is the number of local sources (LS) included in the GW-addressed frame reception record 46, and the integer Y is the number of local sources included in the relay information 47. The variables x, y are used for the coefficients of the number of local sources to be processed. In addition, FIG. 24 is an example of a specification method of arrangement, and for example, the order of process may be changed such that the process of steps S121 to S125 is performed before steps S117 to S120. Further, the orders of step S115 and step S116 may be changed with each other.

If the specification of arrangement is requested from the control unit 31, the arrangement state specifying unit 32 determines whether there is a communication apparatus which relays a frame of which a global destination is a gateway by referring to the GW-addressed frame reception record 46 (step S111). When there is no communication apparatus which relays a frame of which a global destination is a gateway, the arrangement state specifying unit 32 determines that the communication apparatus is the communication apparatus 10 located at the end of the communication path (No in step S111, step S112). When there is a communication apparatus which relays a frame of which a global destination is a gateway, the arrangement state specifying unit 32 determines whether the number of entries M in the link table 41 is equal to or greater than the threshold Th1 (Yes in step S111, step S113). When the number of entries M in the link table 41 is less than the threshold Th1, the arrangement state specifying unit 32 determines that the communication apparatus 10 is located in the dispersion area (No in step S113, step S114).

When the number of entries M in the link table 41 is equal to or greater than the threshold Th1, the arrangement state specifying unit 32 acquires the number (X) of local sources of a gateway-addressed frame which has been already relayed, with reference to the GW-addressed frame reception record 46 (Yes in step S113, step S115). The arrangement state specifying unit 32 sets the variables x, y to 1 (step S116). The arrangement state specifying unit 32 determines whether the number of entries in the link table 41 in the GW-addressed frame reception record 46 that the x-th local source holds is equal to or greater than the threshold Th2 (step S117). At this time, it is assumed that the arrangement state specifying unit 32 acquires information regarding the x-th local source in the GW-addressed frame reception record 46 from the link table 41. When the number of entries in the link table 41 that the x-th local source holds is less than the threshold Th2, the arrangement state specifying unit 32 determines that the data delivered from the gateway is transmitted to the dispersion area (No in step S117, step S120).

In contrast, when the number of entries in the link table 41 that the x-th local source in the GW-addressed frame reception record 46 holds is equal to or greater than the threshold Th2, the arrangement state specifying unit 32 increase the variable x by one (Yes in step S117, step S118). Thereafter, the arrangement state specifying unit 32 determines whether the variable x is greater than the integer X, and repeats the process of steps S117 to S120 until the variable x exceeds the integer X (No in step S119). When the variable x is greater than the integer X, the number of the adjacent apparatuses is equal to or greater than the threshold Th2 even in any local source in the GW-addressed frame reception record 46 (Yes in step S119). In other words, when the variable x is greater than the integer X, the communication apparatus 10 does not transmit data to the communication apparatuses 10 arranged in the dispersion area.

When the number of the adjacent apparatuses is equal to or greater than the threshold Th2 even in any local source in the GW-addressed frame reception record 46, the arrangement state specifying unit 32 acquires the number (Y) of the local sources, which is recorded in the relay information 47 (step S121). The arrangement state specifying unit 32 determines whether the number of entries of the link table 41 that the y-th local source holds in the relay information 47 is equal to or greater than the threshold Th2 (step S122). In addition, the arrangement state specifying unit 32 acquires information regarding the y-th local source in the relay information 47 from the link table 41. When the number of entries in the link table 41 that the y-th local source holds is less than the threshold Th2, the arrangement state specifying unit 32 determines that the frames received from the apparatuses arranged in the dispersion area are transmitted to the dense area (No in step S122, step S125). In addition, data delivered from the gateway is included in the frames that the communication apparatus 10 receives from the apparatuses arranged in the dispersion area.

In contrast, when the number of entries in the link table 41 that the y-th local source in the relay information 47 holds is equal to or greater than the threshold Th2, the arrangement state specifying unit 32 increase the variable y by one (Yes in step S122, step S123). Thereafter, the arrangement state specifying unit 32 determines whether the variable y is greater than the integer Y, and repeats the process of steps S122 to S125 until the variable y exceeds the integer Y (step S124). When the variable y is greater than the integer Y, the number of the adjacent apparatuses is equal to or greater than the threshold Th2 even in any local source in the relay information 47 (Yes in step S124). In other words, when the variable y is greater than the integer Y, the communication apparatus 10 is not a communication apparatus 10 which transmits the frame received from the apparatuses arranged in the dispersion area to the apparatuses arranged in the dense area. Thus, the arrangement state specifying unit 32 determines that the communication apparatus 10 is arranged in the dense area (step S126).

Determination of the Number of Times of Broadcast

If an arrangement determination result is acquired from the arrangement state specifying unit 32, the control unit 31 determines the number of times of broadcast according to the arrangement of the communication apparatus 10. A determination method of the number of times of broadcast in a case when the communication apparatus 10 is arranged in the dispersion area and in a case when the communication apparatus 10 is arranged in the dense area is the same as in the first to third embodiments. Further, when the communication apparatus 10 is located at the end of the communication path, the communication apparatus 10 does not perform broadcast in the same manner as in the second embodiment.

When the communication apparatus 10 is determined to a communication apparatus 10 which transmits the data delivered from the gateway to the dispersion area, the control unit 31 specifies an apparatus having a relatively worse communication status, among apparatuses included in the dispersion area among the adjacent apparatuses of the communication apparatus 10. The control unit 31 determines the number of times of broadcast using the number-of-times-information 43 such that the probability of success in the transmission of a frame to the specified apparatus is equal to or greater than the predetermined threshold. In other words, the control unit 31 determines the number of times associated with the quality of communication path to the specified apparatus in the number-of-times-information 43.

In contrast, when the communication apparatus 10 is determined to a communication apparatus 10 which transmits a frame received from an apparatus arranged in the dispersion area to an apparatus arranged in the dense area, the control unit 31 sets the number of times of broadcast to 1. That is because in the communication apparatus 10 which transmits the frame which has been received from the apparatus arranged in the dispersion area to the apparatus arranged in the dense area, if the frame is not broadcasted, there is a possibility that the frame does not reach any of the communication apparatuses 10 arranged in the dense area. For example, if the node N96 of FIG. 22 does not broadcast a frame, a frame that the node N96 receives from the node N95 does not reach the nodes N97 to N99. Therefore, if the node N96 does not broadcast a frame, the frame is not transmitted to any of communication apparatuses 10 arranged in the dense area including the nodes N97 to N99. However, if the communication apparatus 10 as the node N96 which is in contact with the dense area performs broadcast once, there is a high possibility that one communication apparatus 10 located in the dense area may receive the frame. Therefore, the control unit 31_96 sets the number of times of broadcast from the node N96 to 1.

Figure 25:
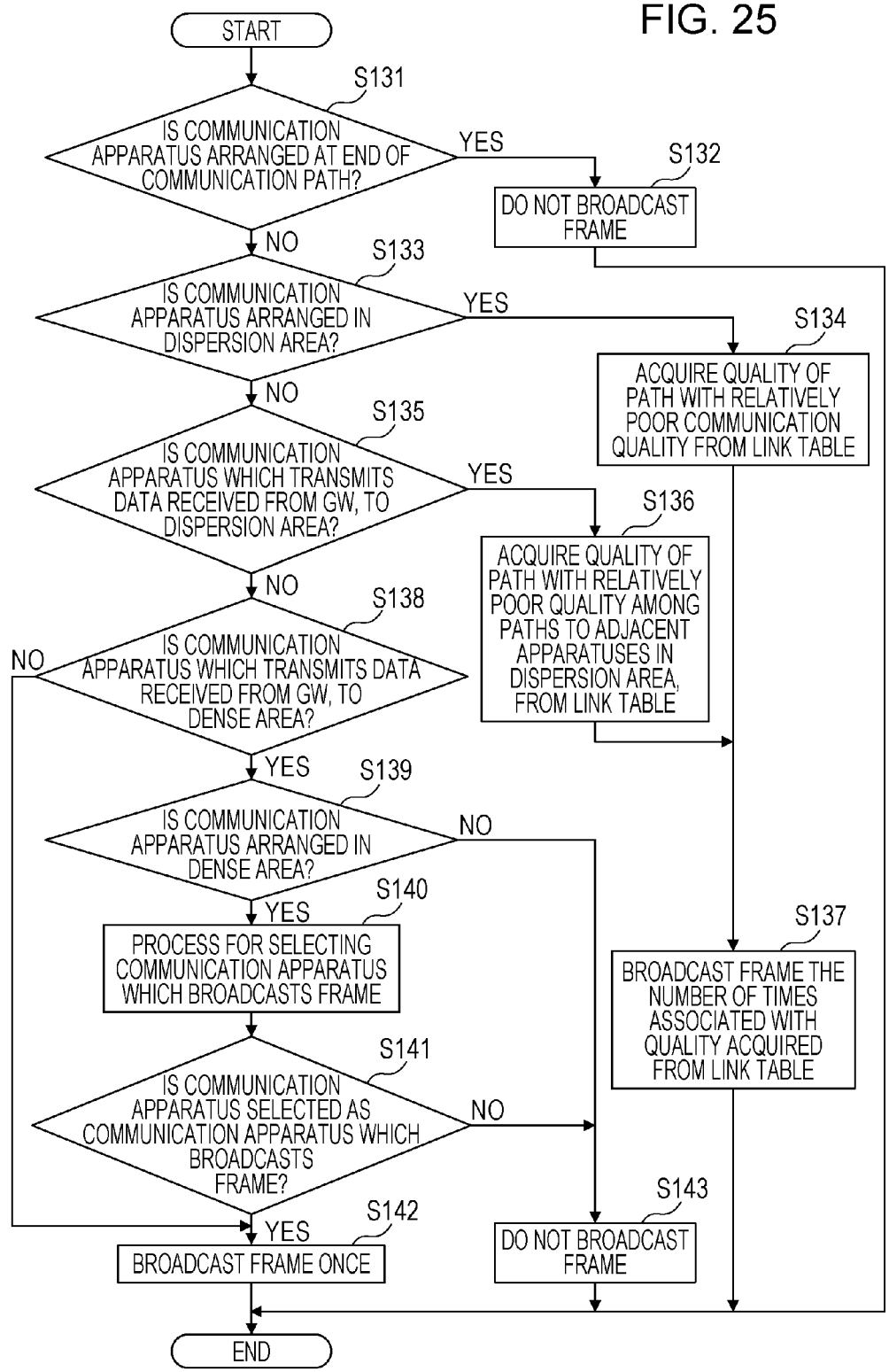
FIG. 25 is a flowchart illustrating an example of a determination method of the number of times of broadcast in the fourth embodiment.

FIG. 25 is a flow chart illustrating an example of determining the number of times of broadcast in the fourth embodiment. Steps S131 to S134, and S137 in FIG. 25 are the same as steps S81 to S85 described with reference to FIG. 18.

When a communication apparatus 10 is neither a communication apparatus 10 located in the end of a path nor a communication apparatus 10 arranged in the dispersion area, the control unit 31 determines whether the communication apparatus 10 is an apparatus which transmits the data delivered from the gateway to the dispersion area (step S135). When the data delivered from the gateway is transmitted to the dispersion area, the control unit 31 acquires the quality of a path having a relatively worse communication quality among paths to the adjacent apparatuses in the dispersion area, from the link table 41 (Yes in step S135, step S136). The control unit 31 acquires the number of times associated with the quality of the specified path from the number-of-times-information 43 and transmits the broadcast frame to the transmission unit 11 the acquired number of time (step S137).

When the delivered data is not transmitted to the dispersion area, the control unit 31 determines whether the communication apparatus 10 receives the data delivered from the gateway through an apparatus arranged in the dispersion area and transmits the data to an apparatus arranged in the dense area (No in step S135, step S138). When the communication apparatus 10 receives the data delivered from the gateway through an apparatus arranged in the dispersion area and transmits the data to an apparatus arranged in the dense area, the control unit 31 sets the number of times of broadcast to 1 (No in step S138, step S142). The process of steps S139 to S143 is the same as steps S45 to S49 described with reference to FIG. 13 and steps S87 to S91 of FIG. 18.

In this manner, in view of a direction along which a data frame is delivered, the number of times of broadcast may be adjusted by the determination as to whether the delivered information is to be arranged in either the dense area or the dispersion area, even in a communication apparatus 10 which is located in the boundary between the dense area and the dispersion area. Therefore, the number of frames transmitted and received in a network is optimized.

Simulation Result

Hereinafter, an example of a simulation result in the fourth embodiment will be described with reference to FIG. 26 to FIG. 29.

Figure 26:
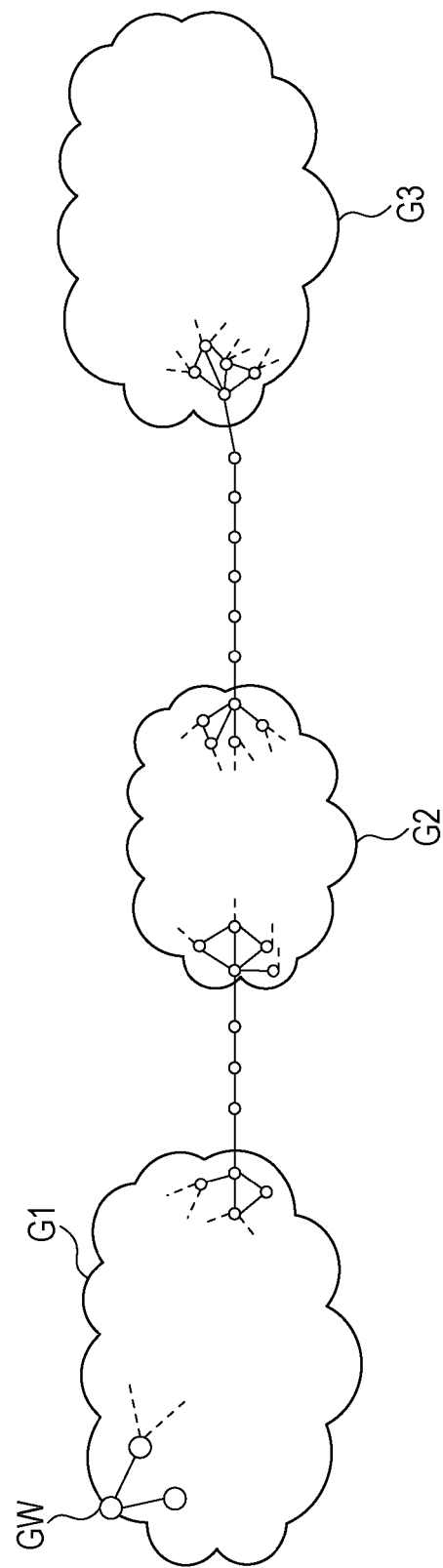
FIG. 26 is a diagram illustrating an example of a network.

FIG. 26 illustrates an example of a network. The network illustrated in FIG. 26 includes groups G1 to G3. In the example of FIG. 26, it is assumed that each of the groups G1 to G3 includes 165 communication apparatuses 10. Further, the group G1 and the group G2 are connected through three communication apparatuses 10, and the group G2 and the group G3 are connected through six communication apparatuses 10. Here, one group is a range in which a frame transmitted from a communication apparatus 10 included in the group is able to be received. For example, if the statuses of paths between all communication apparatuses 10 are good, all other communication apparatuses 10 included in the group G1 are able to receive the frame which a certain communication apparatus 10 in the group G1 has transmitted. The same is applied to the groups G2 and G3. In the example of FIG. 26, it is assumed that a gateway is included in the group G1. In other words, the group G1 includes 164 communication apparatuses 10 in addition to the gateway. Accordingly, the number of communication apparatuses 10 included in the network illustrated in FIG. 26 is 165+3+165+6+165=504. In addition, FIG. 26 is an example of a network, and the number of communication apparatuses 10 included in a network to which a communication method according to an embodiment is applied, the number of groups, the number of communication apparatuses 10 in a group, and the number of communication apparatuses 10 connecting groups may arbitrarily be changed.

Figure 27:
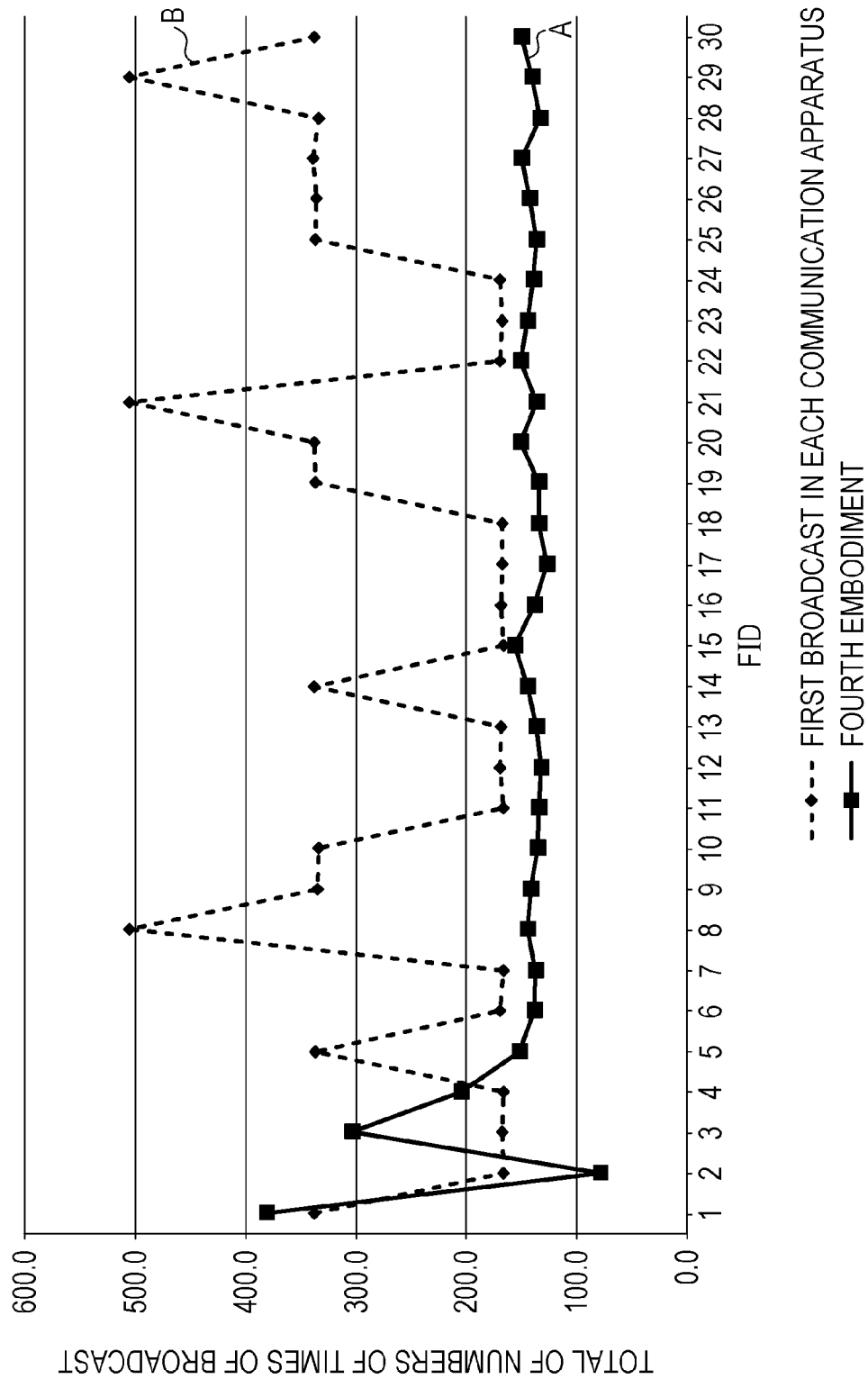
FIG. 27 is a diagram illustrating an example of a simulation result of the number of times of broadcast being performed.

FIG. 27 illustrates an example of a simulation result of the number of times of broadcast being performed. FIG. 27 is a result of simulation when it is assumed that the communication apparatuses 10 of the network fail in reception of frames with probabilities of 1% to 99% in the network illustrated in FIG. 26. In the simulation, the probability of failure in reception of frames is randomly assigned to the communication apparatuses 10 of the network. Further, it is assumed that the assignment of the probability of failure in reception of frames varies depending on FID. In the example of FIG. 27, by transmitting frames of FID=1 to 30 from the gateway, the total of the numbers of times of broadcast which are performed in the network in the respective communication apparatuses 10 of the network is illustrated for each FID. In addition, it is illustrated that the greater the value of FID, the later the frame is transmitted from the gateway. For example, the gateway broadcasts the frame of FID=2 after broadcasting the frame of FID=1.

Here, the total of the number of times of broadcasts is the total of the broadcasts that the communication apparatuses 10 of the network perform. For example, when all communication apparatuses 10 in the network including the gateway respectively perform broadcast once, the total of the number of times of broadcast in the network is calculated as follows:

When there is a communication apparatus 10 which performs broadcast total=165×1+3×1+165×1+6×1+165×1=504 times, further, a plurality of times, the number of times of broadcast by the communication apparatus 10 is equal to or greater than 1 at the time of calculation of the total. For example, it is assumed that the node N1 broadcasts a frame four times. In this case, the number of times of broadcast of the node N1 is four at the time of calculation of the total. In contrast, since a communication apparatus 10 which fails to receive the broadcast frame and a communication apparatus 10 determines that broadcast is not performed do not perform broadcast, the number of times of broadcast is set to 0.

The graph A in FIG. 27 is a result obtained by plotting the total of the numbers of times of broadcast in association with the FID when the fourth embodiment is applied to the network in FIG. 26. In contrast, the graph B is a result obtained by plotting the total of the number of times of broadcast in association with the FID when a method in which the communication apparatuses 10 which have succeeded in the reception of the broadcast frame respectively broadcast the reception frame once to the network in the FIG. 26. In addition, the setting of a probability of being failed in the reception of a frame with respect to each communication apparatus 10 is the same in the graph A and the graph B. In the graph A, the total of the numbers of broadcast is lower than that of the graph B with respect to the frames after FID=5.

FIG. 28 illustrates an example of a proportion of the communication apparatuses 10 which have acquired data through broadcast. FIG. 28 illustrates a proportion of the communication apparatuses 10 which have succeeded in the reception of the broadcast frame, among the communication apparatuses 10 included in the network in FIG. 26, when broadcast is performed the number of times illustrated in FIG. 27. The graph C illustrates a proportion of the communication apparatuses 10 which have received data, when broadcast is performed the number of times illustrated in the graph A (FIG. 27), by applying the fourth embodiment to the network in FIG. 26. In contrast, the graph D illustrates a proportion of the communication apparatuses 10 which have acquired data, when broadcast is performed the number of times illustrated in the graph (FIG. 27), by a method in which the communication apparatuses 10 which have succeeded in the reception of the broadcast frame respectively broadcast the reception frame once. In addition, the setting of a probability of each communication apparatus 10 being failed in the reception of a frame is the same for each FID in FIG. 27 and FIG. 28.

As illustrated in the graph C, when the fourth embodiment is applied to the network in FIG. 26, frames other than FID=2 reach all communication apparatuses 10. In contrast, as illustrated in the graph D, in a method in which a communication apparatus 10 which have succeeded in the reception of the broadcast frame broadcasts one reception frame at a time, frames other than FID=8, 21, and 29 do not reach all communication apparatuses 10. Accordingly, it may be ascertained from FIG. 27 and FIG. 28 that it is possible to reduce the number of frames in the network while maintaining the reachability of the frame to approximately 100%, in the method according to the fourth embodiment. In the network such as FIG. 26, if even one of the communication apparatuses 10 connecting groups fails in the reception of the broadcast frame, the communication apparatus 10 included in the group of the communication apparatuses 10 having greater number of hops from the gateway than that of the communication apparatus 10 which has failed in the reception is not able to receive the broadcast frame. Accordingly, for example, as FID=6, 7, and the like, when the proportion of communication apparatuses 10 which have received a broadcast frame is about 33% in the graph D, it is considered that the communication state between the communication apparatuses 10 between the group G1 and the group G2 is getting worse. In contrast, as FID=9, 10, and the like, when the proportion of communication apparatuses 10 which have received a broadcast frame is about 66% in the graph D, it is considered that the communication state between the communication apparatuses 10 between the group G2 and the group G3 is getting worse. However, in the method according to the fourth embodiment, on paths of which the communication state is getting worse, as described with reference to FIG. 11 and the like, the number of times of broadcast is increased, and thus it is easy to succeed in the reception of the broadcast frame. Therefore, as FID=6, 7, 9, 10, and the like, even in a status in which the proportion of communication apparatuses 10 which have received a broadcast frame is about 30% in the graph D, the reachability of a frame is maintained at a high probability in the graph C.

FIG. 29 illustrates an example of a simulation result of the number of times that one communication apparatus 10 receives the same broadcast frame. The graph E plots the average number of the broadcast frames that the communication apparatuses 10 of the network receive as a function of FID, when the broadcast of the number of times illustrated in the graph A of FIG. 27 is performed. When the broadcast is performed the number times illustrated in the graph A in FIG. 27, the graph F plots the number of receptions of broadcast frames, in a communication apparatus 10 which has received the broadcast frame most frequently in the network, as a function of the FID. In addition, either the graph E or F is a graph which may be obtained for a case in which the communication method according to the fourth embodiment is performed in the network illustrated in FIG. 26.

In contrast, the graphs G and H are graphs in a case of employing a method in which a communication apparatus which have succeeded in the reception of the broadcast frame broadcasts one reception frame at a time in a network illustrated in FIG. 26. When the broadcast is performed the number time illustrated in the graph B in FIG. 27, the graph G represents the average number of broadcast frames that a communication apparatus 10 in a network has received as a function of the FID. When the broadcast is performed the number times illustrated in the graph B in FIG. 27, the graph H represents the number of receptions of broadcast frames, in a communication apparatus 10 which has received the broadcast frame most frequently in the network, as a function of the FID.

If the graph E and the graph G in FIG. 29 are compared, after FID=4, the value of the graph E is lower than the value of the graph G. Accordingly, in the fourth embodiment, it may be said that the number of frames that each communication apparatus 10 in the network receives is reduced, as compared to a method in which the communication apparatus which have succeeded in the reception of the broadcast frame broadcasts one reception frame at a time. Further, if the graph F and the graph H are compared, the value of the graph F is lower than the value of the graph H in all frames. Accordingly, in a case of employing the fourth embodiment, the number of receptions of apparatuses which receive the broadcast frame most frequently in the network is smaller as compared to a case in which the communication apparatus which have succeeded in the reception of the broadcast frame broadcasts one reception frame at a time. Therefore, in the fourth embodiment, it may be said that the processing load of the communication apparatus 10 is degraded as compared to a method in which the communication apparatus which have succeeded in the reception of the broadcast frame broadcasts one reception frame at a time.

From simulation results described with reference to FIG. 26 to FIG. 29, if the fourth embodiment is used, it is ascertained that it is possible to improve the reachability of the broadcast frame while reducing the number of frames transmitted and received in a network.

As described in the fourth embodiment, a network and the like in which a measured value is notified from the sensor or the meter of utilities to the gateway and the like is considered as a case in which the transmission and reception of a data frame is performed between the gateway and the communication apparatuses 10 in the network. When measurement points of the sensor and the meter of utilities are located densely, there may be a possibility that the number of adjacent apparatuses for one communication apparatus 10 becomes enormous, as illustrated in FIG. 26. In the fourth embodiment, after the communication apparatuses 10 used in the communication path are specified using the GW-addressed frame reception record 46 and the relay information 47, a communication apparatus 10 which transmits a frame to the dispersion area and the dense area is selected among the communication apparatuses 10 used in the communication path. Therefore, even if the number of adjacent apparatuses becomes enormous, the communication apparatus 10 which transmits a frame to the dispersion area and the dense area may be specified. The appropriate number of broadcast may be specified depending on the specified arrangement.

Others

In addition, embodiments are not limited to the above embodiments, and may be modified in various ways. Hereinafter, the example will be described.

It is possible to modify the embodiments, depending on the installation situation of the communication apparatus 10, so as to adjust the number of times of broadcast for the communication apparatus 10 of the arrangement of a specific type. For example, in a system in which the influence of the communication apparatus 10 in the dispersion area is negligible, only the dense area may be subjected to the adjustment of the number of times of broadcast. In this case, in the dense area, the communication apparatus 10 which is selected as described in the first embodiment performs broadcast, and the communication apparatus 10 which is not selected does not perform broadcast. Further, as described in the second embodiment, it is possible to set such that the adjustment of the number of times of broadcast is not performed in other arrangements such as the dense area and the dispersion area while setting such that the communication apparatus 10 arranged in the end of a communication path does not perform broadcast. Further, after the number of times of broadcast is adjusted in the communication apparatus 10 arranged in the dense area, the communication apparatus 10 arranged at the end of a communication quality does not perform broadcast, but it is possible not to adjust the number of times of broadcast in the dispersion area or the like.

In the fourth embodiment, a case in which the transmission and reception of a data frame is performed between the gateway and the communication apparatuses 10 has been described, but the fourth embodiment may be used even in the system in which the transmission and reception of a data frame is performed between other communication apparatuses 10. In this case, the transmission processing unit 25 checks the global source of a data frame at the time of transmission process. When the global source is the distribution source of data included in the broadcast frame, the transmission processing unit 25 records the local source of data frame in the relay information 47.

The application processing unit 26 may output data subjected to be broadcasted and a signal informing the control unit 31 of the reception of the broadcast frame to the control unit 31. In this case, the control unit 31 makes a request of the specification of an arrangement state to the arrangement state specifying unit 32 as triggered by an input of the signal informing the reception of the broadcast frame.

Further, the communication apparatus 10 may include the number of entries included in the link table 41 that the communication apparatus 10 holds, in a Hello message header, instead of a Hello header of a Hello frame. When the number of entries of the link table 41 is included in the Hello header, an area for recording the number of entries is not included in each Hello header, and thus it is possible to reduce the size of the Hello frame.

In the second to fourth embodiments, a case in which the distribution source of a broadcast frame is a gateway has been described as an example, but the distribution source of a broadcast frame is not limited to the gateway. When an apparatus other than the gateway is the distribution source of a broadcast frame, information such as a transmission performance of the distribution source-addressed frame is recorded in association with the identifier of the communication apparatus 10 which is the distribution source of a broadcast frame instead of the GW-addressed frame reception record 45.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method for causing a communication apparatus included in a network to perform a process, the communication method comprising:

specifying an arrangement of the communication apparatus in the network, using the number of adjacent apparatuses, which are apparatuses adjacent to the communication apparatus, and the number of adjacent apparatuses of each of the adjacent apparatuses;

determining the number of times of broadcast of a broadcast frame, using number-of-times-information in which candidates for an arrangement of the communication apparatus in the network and the number of times at which the communication apparatus broadcasts a frame are associated; and broadcasting the broadcast frame the determined number of times;

wherein the specifying includes:

determining that the communication apparatus is arranged in a dispersion area in which apparatuses are located more sparsely than a predetermined density, when the number of the adjacent apparatuses is below a first threshold;

determining that the communication apparatus is arranged in a dense area in which apparatuses are located equal to or more densely than the predetermined density, when the number of the adjacent apparatuses is equal to or greater than the first threshold and the number of adjacent apparatuses of each of the adjacent apparatuses is equal to or greater than a second threshold; and determining that the communication apparatus is arranged in a boundary between the dense area and the dispersion area, when the number of the adjacent apparatuses is equal to or greater than the first threshold and the number of adjacent apparatuses of at least one adjacent apparatus of the adjacent apparatuses is less than the second threshold.

2. The communication method according to claim 1, wherein the communication apparatus performs:

setting a selection probability which is a probability of being selected for an apparatus that transmits the broadcast frame, when the communication apparatus is arranged in the dense area in which apparatuses are located as densely as a possibility of occurrence of congestion might not be ignored;

determining whether the communication apparatus is selected for the apparatus that transmits the broadcast frame; and broadcasting the broadcast frame the number of times associated with the dense area in the number-of-times-information when the communication apparatus is selected for the apparatus that transmits the broadcast frame.

3. The communication method according to claim 2, wherein the broadcast frame includes a frame identifier for identifying the broadcast frame, and
wherein the communication apparatus reduces a probability of being selected for an apparatus that transmits a broadcast frame to which a second value being greater than a first value is assigned as the frame identifier, if a number of receptions of a broadcast frame of which the frame identifier is the first value exceeds an upper threshold which is an upper limit of a value to be acceptable as the number of receptions, and increases a probability of being selected for an apparatus that transmits a broadcast frame to which the second value is assigned as the frame identifier, when the number of receptions is less than a lower threshold which is a lower limit of a value to be acceptable as the number of receptions.

4. The communication method according to claim 2, wherein the number-of-times-information is set such that the number of times of broadcast of the broadcast frame is increased as a quality of a path is worse, and
wherein the communication apparatus calculates a communication quality of a path to the communication apparatus, from an apparatus having a relatively worse state of communication with the communication apparatus among the adjacent apparatuses, when the communication apparatus is located in the dispersion area in which apparatuses are located as sparsely as congestion does not occur or in a boundary between the dense area and the dispersion area, and broadcasts the broadcast frame the number of times associated with an arrangement of the communication apparatus and the communication quality in the number-of-times-information.

5. The communication method according to claim 2, wherein the number-of-times-information is set such that the number of times of broadcast of the broadcast frame is increased as a quality of a path is worse, and
wherein the communication apparatus specifies transmission sources of data frame addressed to a distribution source of data included in the broadcast frame, calculates a communication quality of a path to the communication apparatus, from an apparatus having a relatively worse state of communication with the communication apparatus among the transmission sources, when the communication apparatus is located in the dispersion area in which apparatuses are located as sparsely as congestion does not occur or in a boundary between the dense area and the dispersion area, and broadcasts the broadcast frame the number of times associated with an arrangement of the communication apparatus and the communication quality in the number-of-times-information.

6. The communication method according to claim 1, wherein the communication apparatus generates a first list which is a list of transmission sources of frames of which destinations are designated to a distribution source of data included in the broadcast frame, generates a second list which is a list of transmission sources of frames of which the distribution sources are a source, when the number of the adjacent apparatuses is equal to or greater than the first threshold and the number of apparatuses with which at least one of apparatuses included in the first list is capable of communicating is less than the second threshold, the communication apparatus, determines that the broadcast frame is transmitted from the dense area in which apparatuses are located as densely as a possibility of occurrence of congestion might not be ignored to the dispersion area in which apparatuses are located as sparsely as congestion does not occur, sets an apparatus having a relatively worse state of communication with the communication apparatus among apparatuses included in the first list to an index apparatus which is an index for determining the number of times of broadcast, and determines the number of times associated with the index apparatus and the quality of communication with the communication apparatus, among the number of times associated with an arrangement of a boundary between the dense area and the dispersion area, in the number-of-times-information as the number of times at which the communication apparatus broadcasts the broadcast frame, and when the number of the adjacent apparatuses is equal to or greater than the first threshold and the number of apparatuses with which at least one of apparatuses included in the second list is capable of communicating is less than the second threshold, the communication apparatus, determines that the number of times of broadcast is transmitted from the dispersion area to the dense area, and broadcasts the broadcast frame at least once.

7. The communication method according to claim 1, wherein the communication apparatus does not broadcast the broadcast frame, when a frame of which a destination is the distribution source of data included in the broadcast frame is not relayed over a predetermined period or more.

8. A communication apparatus included in a network, comprising:
- a storage unit configured to store the number of times of broadcast of a broadcast frame in association with candidates for an arrangement of the communication apparatus in the network;
- a specifying unit configured to specify an arrangement of the communication apparatus in the network, using the number adjacent apparatuses which are apparatuses adjacent to the communication apparatus, and the number of adjacent apparatuses of each of the adjacent apparatuses;
- a control unit configured to perform control to broadcast the broadcast frame the number of times associated with a specified arrangement and the same candidate; and
- a transmission unit configured to broadcast the broadcast frame, wherein
- the specifying unit is further configured to:
  - determine that the communication apparatus is arranged in a dispersion area in which apparatuses are located more sparsely than a predetermined density, when the number of the adjacent apparatuses is below a first threshold,
  - determine that the communication apparatus is arranged in a dense area in which apparatuses are located equal to or more densely than the predetermined density, when the number of the adjacent apparatuses is equal to or greater than the first threshold and the number of adjacent apparatuses of each of the adjacent apparatuses is equal to or greater than a second threshold, and
  - determine that the communication apparatus is arranged in a boundary between the dense area and the dispersion area, when the number of the adjacent apparatuses is equal to or greater than the first threshold and the number of adjacent apparatuses of at least one adjacent apparatus of the adjacent apparatuses is less than the second threshold.

9. The communication apparatus according to claim 8, further comprising:
- a setting unit configured to set a selection probability which is a probability of being selected for an apparatus that transmits the broadcast frame, when it is determined that the communication apparatus is arranged in the dense area in which apparatuses are located as densely as a possibility of occurrence of congestion might not be ignored; and
- a determining unit configured to determine whether the communication apparatus is selected for the apparatus that transmits the broadcast frame;
- wherein the control unit causes the transmission unit to broadcast the broadcast frame the number of times associated with the dense area in the storage unit when the communication apparatus is selected for the apparatus that transmits the broadcast frame.

10. The communication apparatus according to claim 9, wherein the broadcast frame includes a frame identifier for identifying the broadcast frame, and
wherein the setting unit
reduces a probability of being selected for an apparatus that transmits a broadcast frame to which a second value being greater than a first value is assigned as the frame identifier, when the number of receptions of a broadcast frame of which the frame identifier is the first value exceeds an upper threshold which is an upper limit of a value to be acceptable as the number of receptions, and
increases a probability of being selected for an apparatus that transmits a broadcast frame to which the second value is assigned as the frame identifier, when the number of receptions is less than a lower threshold which is a lower limit of a value to be acceptable as the number of receptions.

11. The communication apparatus according to claim 9,
wherein the storage unit sets the number of times of broadcast so as to increase the number of times of broadcast as the quality of a path is worse,
wherein the control unit calculates a communication quality of a path to the communication apparatus, from an apparatus having a relatively worse state of communication with the communication apparatus among the adjacent apparatuses, when it is determined that the communication apparatus is located in the dispersion area in which apparatuses are located as sparsely as congestion does not occur or in a boundary between the dense area and the dispersion area, and
wherein the control unit broadcasts the broadcast frame the number of times associated with an arrangement of the communication apparatus and the communication quality.

12. The communication apparatus according to claim 9, further comprising:
- a transmission processing unit configured to transmit an another communication apparatus-addressed frame,
- wherein the transmission processing unit specifies a transmission source of a data frame of which destination is the destination source of data included in the broadcast frame,
- wherein the storage unit associates a quality of a path with the number of times of broadcast so as to increase the number of times of broadcast as the quality of a path is worse, and
- wherein the control unit
  - calculates a communication quality of a path to the communication apparatus, from an apparatus having a relatively worse state of communication with the communication apparatus among the transmission sources, when it is specified that the communication apparatus is located in the dispersion area in which apparatuses are located as sparsely as congestion does not occur or in a boundary between the dense area and the dispersion area, and
  - performs a process of broadcasting the broadcast frame the number of times associated with an arrangement of the communication apparatus and the communication quality.

13. The communication apparatus according to claim 8, further comprising:
- a transmission processing unit configured to transmit an another communication apparatus-addressed frame,
- wherein the storage unit associates a quality of a path with the number of times of broadcast so as to increase the number of times of broadcast as the quality of a path is worse, and
- wherein the transmission processing unit
  - generates a first list which is a list of transmission sources of frames of which destinations are designated to a distribution source of data included in the broadcast frame, generates a second list which is a list of transmission sources of frames of which the distribution sources are a source, when the number of the adjacent apparatuses is equal to or greater than the first threshold and the number of apparatuses with which at least one of apparatuses included in the first list is capable of communicating is less than the second threshold, the specifying unit determines an arrangement of the communication apparatus to an arrangement in which that the broadcast frame is transmitted from the dense area in which apparatuses are located as densely as a possibility of occurrence of congestion might not be ignored to the dispersion area in which apparatuses are located as sparsely as congestion does not occur, and the control unit performs a process of broadcasting the broadcast frame the number of times associated with a quality of a path to an apparatus having a relatively worse state of communication with the communication apparatus among apparatuses included in the first list, and when the number of the adjacent apparatuses is equal to or greater than the first threshold and the number of apparatuses with which at least one of apparatuses included in the second list is capable of communicating is less than the second threshold, the specifying unit determines an arrangement of the communication apparatus to an arrangement in which that the broadcast frame is transmitted from the dispersed area to the dense area, and the control unit performs control for broadcasting the broadcast frame at least once.

14. The communication apparatus according to claim 8, wherein the control unit does not perform a process of broadcasting the broadcast frame, when a frame of which a destination is the distribution source of data included in the broadcast frame is not relayed over a predetermined period or more.

15. A communication system comprising:

a plurality of communication apparatuses including a first communication apparatus in a network;

wherein a first communication apparatus including:

a memory; and a processor, coupled to the memory, configured to:
   receive a broadcast frame which is transmitted from a second communication apparatus,
   specifies an arrangement of the first communication apparatus in the network, using the number of adjacent apparatuses which are apparatuses adjacent to the first communication apparatus, and the number of adjacent apparatuses of each of the adjacent apparatuses;
   determines the number of times of broadcast of the broadcast frame, using number-of-times-information in which candidates for an arrangement of the first communication apparatus in the network and the number of times of broadcast are associated; and
   broadcasts the broadcast frame the determined number of times;

wherein, in the specifying, the processor is further configured to:
   determine that the communication apparatus is arranged in a dispersion area in which apparatuses are located more sparsely than a predetermined density, when the number of the adjacent apparatuses is below a first threshold;
   determine that the communication apparatus is arranged in a dense area in which apparatuses are located equal to or more densely than the predetermined density, when the number of the adjacent apparatuses is equal to or greater than the first threshold and the number of adjacent apparatuses of each of the adjacent apparatuses is equal to or greater than a second threshold; and
   determine that the communication apparatus is arranged in a boundary between the dense area and the dispersion area, when the number of the adjacent apparatuses is equal to or greater than the first threshold and the number of adjacent apparatuses of at least one adjacent apparatus of the adjacent apparatuses is less than the second threshold.

* * * * *